US007847844B2

(12) United States Patent
Takemoto et al.

(10) Patent No.: US 7,847,844 B2
(45) Date of Patent: Dec. 7, 2010

(54) INFORMATION PROCESSING APPARATUS AND METHOD FOR DETERMINING WHETHER A DETECTED INDEX IS AN INDEX INCLUDED IN SENSED IMAGE DATA

(75) Inventors: Kazuki Takemoto, Kawasaki (JP); Kiyohide Satoh, Kawasaki (JP); Shinji Uchiyama, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/610,797

(22) Filed: Dec. 14, 2006

(65) Prior Publication Data

US 2007/0139321 A1 Jun. 21, 2007

(30) Foreign Application Priority Data

Dec. 15, 2005 (JP) ............................. 2005-362371

(51) Int. Cl.
*H04N 9/077* (2006.01)
*G06K 9/00* (2006.01)

(52) U.S. Cl. ........................................ 348/286; 382/154

(58) Field of Classification Search ............... 348/286; 382/106, 153, 166, 286
See application file for complete search history.

(56) References Cited

U.S. PATENT DOCUMENTS

| 6,650,776 | B2 | 11/2003 | Ihara et al. | |
| 6,956,503 | B2 * | 10/2005 | Yokokohji et al. | 340/988 |
| 7,467,061 | B2 * | 12/2008 | Satoh et al. | 702/150 |
| 7,580,027 | B2 * | 8/2009 | Satoh et al. | 345/156 |
| 2005/0069172 | A1 * | 3/2005 | Uchiyama | 382/100 |
| 2005/0069174 | A1 * | 3/2005 | Uchiyama et al. | 382/103 |
| 2005/0069196 | A1 * | 3/2005 | Uchiyama et al. | 382/154 |
| 2005/0264433 | A1 * | 12/2005 | Yokokohji et al. | 340/937 |
| 2007/0024712 | A1 | 2/2007 | Morita et al. | |
| 2007/0139322 | A1 * | 6/2007 | Takemoto et al. | 345/87 |
| 2007/0242899 | A1 * | 10/2007 | Satoh et al. | 382/286 |
| 2009/0022369 | A1 * | 1/2009 | Satoh et al. | 382/106 |

FOREIGN PATENT DOCUMENTS

JP 2000-082108 3/2000

OTHER PUBLICATIONS

Rekimoto, "Augmented Reality using 2D matrix code", Interactive System & Software IV, Kindai kagaku sha, 1996.

Kato, et al., "An Augmented Reality System and its Calibration based on Marker Tracking", Transactions of the Virtual Reality Society of Japan, vol. 4, No. 4, pp. 607-616, Dec. 1999.

(Continued)

*Primary Examiner*—Kelly L Jerabek
(74) *Attorney, Agent, or Firm*—Fitzpatrick, Cella, Harper & Scinto

(57) ABSTRACT

A sensed image of the physical space is acquired by an image sensing apparatus. One or more indices are detected from the sensed image. The reliability of each of the detected results is determined by calculating a first reliability value based on the sensed image and a second reliability value based on orientation information of the image sensing apparatus. Each of the detected indices is then identified based on its first and second reliability values.

15 Claims, 17 Drawing Sheets

OTHER PUBLICATIONS

X. Zhang, et al.: "Visual Marker Detection and Decoding in AR Systems: A Comparative Study", Proc. of International Symposium on Mixed and Augmented Reality (ISMAR'02), pp. 97-106, 2002.

I. Skrypnyk, et al.: "Scene Modeling, Recognition and Tracking with Invariant Image Features", Proc. International Symposium on Mixed and Augmented Reality (ISMAR'04), pp. 110-119, 2004.

* cited by examiner

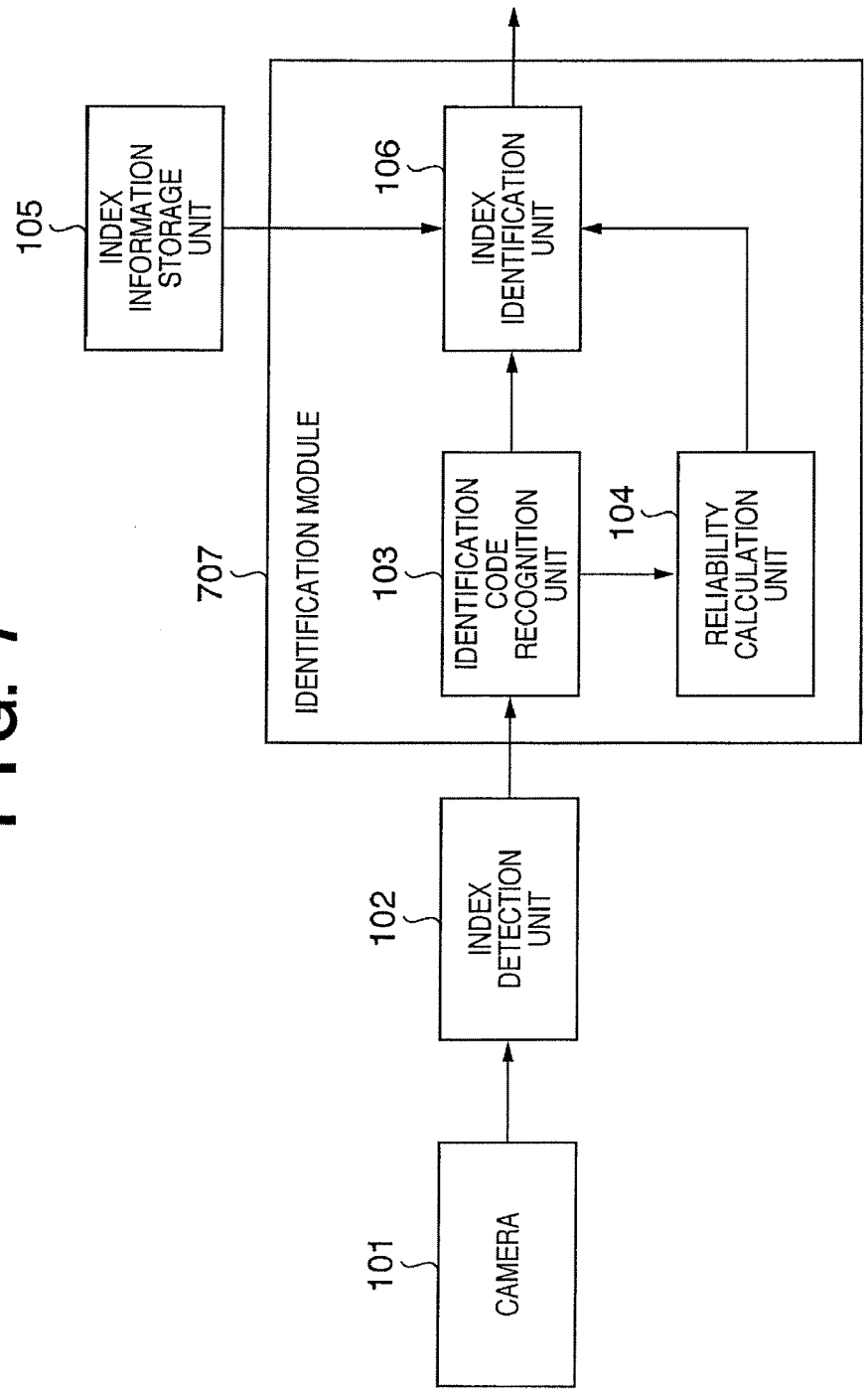

F I G. 8
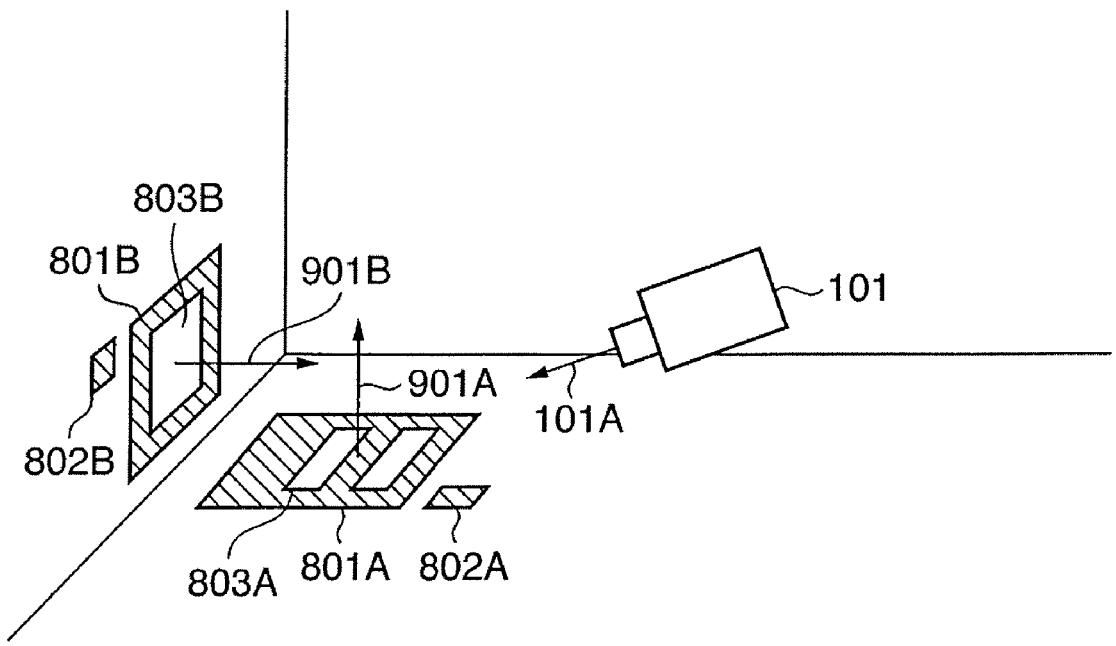

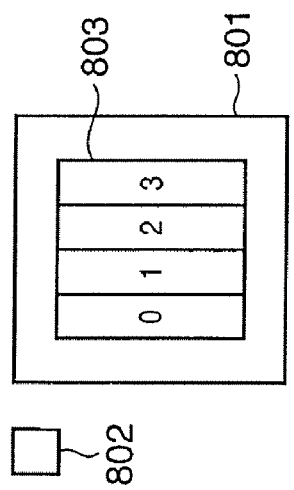
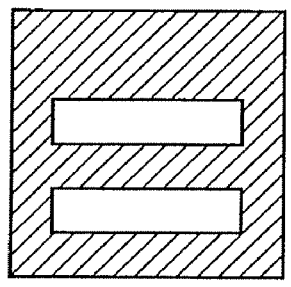
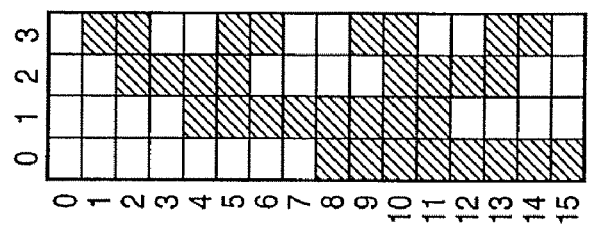
FIG. 10A
FIG. 10B
FIG. 10C

INFORMATION PROCESSING APPARATUS AND METHOD FOR DETERMINING WHETHER A DETECTED INDEX IS AN INDEX INCLUDED IN SENSED IMAGE DATA

BACKGROUND OF THE INVENTION

1. Field of the Invention

The present invention relates to an information processing apparatus and information processing method and specifically to a technique for detecting and identifying indices located on a physical space from an image obtained by sensing the physical space.

2. Description of the Related Art

For example, a mixed reality (MR) system that combines and displays a physical space and virtual space requires position and orientation measurement of an image sensing unit (to be also referred to as a "camera" hereinafter) that senses an image of the physical space. Conventionally, as camera position and orientation measurement techniques which use indices (e.g., objects having specific shapes and/or colors) that are located in the physical space, the techniques disclosed in the following references are known.

D1: Kato, Billinghurst, Asano, and Tachibana: Augmented Reality System and its Calibration based on Marker Tracking, Transactions of the Virtual Reality Society of Japan vol. 4, no. 4, pp. 607-616, December 1999.

D2: X. Zhang, S. Fronz, and N. Navab: Visual marker detection and decoding in AR systems: A comparative study, Proc. of International Symposium on Mixed and Augmented Reality (ISMAR '02), pp. 97-106, 2002.

D3: Junichi Rekimoto: "Augmented Reality System using the 2D matrix code", Interactive System & Software IV, Kindai kagaku sha, 1996.

D4: Japanese Patent Laid-Open No. 2000-82108

In references D1 to D3, a square index is located in advance at a known position in the physical space, and the indices are detected from an image obtained by sensing the physical space including the indices using a camera. Then, the position and orientation of the camera are measured (estimated) based on the coordinates in the image of the four vertices of the square index and their known absolute coordinates. However, since a square has rotation symmetry every 90° with respect to an axis that passes through its center (the intersection of diagonal lines) and is perpendicular to its plane as a rotation axis, the directionality of each index cannot be discriminated based only on the vertex coordinates in the image. For this reason, another feature (e.g., a directional pattern) is used to discriminate the directionality in the index.

Furthermore, when a plurality of indices are used, since they need to be identified based on only the image sensed by the camera, graphic information such as unique patterns, symbols, or the like, which are different for respective indices, is embedded in each index. Since such a square index has information for identification (to be referred to as identification information hereinafter) compared to an index which has only one barycentric point of a specific color area on an image as a feature, they hardly cause misidentification even if many square indices are located. However, since the quantity and precision of the identification information depend only on the sensed image, the index is likely to be misidentified due to quantization errors, camera noise, a shadow cast on the index, and the like.

The probability of misrecognition of the index will be described below using FIGS. 3A to 3C. FIG. 3A is a front view of an index 301. The index 301 has a planar form having a square outer shape. The index 301 is configured to locate a two-dimensional (2D) barcode part 201b as identification information inside a black frame 201a. Therefore, the index 301 is characterized in that identification information can be obtained by recognizing the 2D barcode part 201b from the image of the index 301.

Assume that this index 301 is sensed in a state in which an angle the visual axis of the camera makes with the direction of a normal 201c to the index 301 is close to 90°, as shown in FIG. 3B, and the 2D barcode part inside the index is recognized based on the sensed image. In this case, since the 2D barcode part 201b is distorted considerably, code recognition may fail due to factors such as quantization errors and the like. If recognition of the 2D barcode has failed, the index is misidentified.

When unexpected color information 302, such as a shadow or the like, appears as noise on the 2D barcode part 201b of the index 301, as shown in FIG. 3C, recognition of the 2D barcode fails, resulting in misidentifying the index.

There are two kinds of influences on this misidentification of the camera position and orientation measurement result. First, since the information cannot be recognized as a conventionally defined index, it is not used as information for calculating the position and orientation of the camera, resulting in measurement precision drop. Especially, in a situation in which only one index is sensed, the position and orientation of the camera cannot be obtained.

Second, the recognized identification information overlaps that of another index located at another place. In this case, since that index is misrecognized (misidentified) as that located at the other place, the position and orientation of the camera cannot be correctly obtained (the wrong position and orientation are obtained).

In references D3 and D4, in order to prevent such misidentification, the 2D barcode includes a code for error discrimination, and when the recognition result includes an error, the recognized information is not used as the index.

In addition to error detection of the identification information of the index, when an error correction code, such as a Hamming code or the like, is used as a 2D barcode of the index, an error can be detected, and the identification result can be corrected if the error is 1 bit. Error correction of a plurality of bits can be made from only image information if a 2D barcode adopts a Reed-Solomon code with an enhanced error correction function, such as a QR code standardized by JIS X 0510 (1999).

In case of an index which has a code such as a Hamming code using a relatively simple error correction function as identification information, if a predetermined number or errors are found upon code recognition, errors cannot often be detected and corrected. For example, in the case of an index which has a Hamming-coded 2D code as identification information, if errors of a plurality of bits have occurred, they cannot be correctly corrected. In this case, correct identification information cannot be obtained, and the index is identified using wrong identification information.

An index like a QR code which adopts a coding scheme with an enhanced error correction function can correct errors even when errors of a plurality of bits have occurred. However, compared to an index which uses a relatively simple error correction code, such as a Hamming code, the former index suffers the following problems:

recognition processing takes a long time since error correction operations are complicated;

the index must have a broad 2D barcode area since advanced coding is disabled unless the code must have a large number of bits; and so forth.

In the method of calculating the position and orientation of the camera on the coordinate system having a four-corner feature which is detected by a camera image, as described in references D3 and D4, these problems bring about the following limitations:

real-time processing of the camera position and orientation calculation might be difficult; and the size of the overall index required to calculate the camera position and orientation cannot be reduced.

Upon calculating the camera position and orientation, more indices can be located with decreasing the size of the index, since location flexibility is high. Furthermore, a plurality of indices can be simultaneously sensed more easily than those which have a large size, and improvement of the camera position and orientation measurement precision can be expected. For these reasons, smaller indices are preferably used, and an index which has a code that enhances the error correction function by increasing the code size inside the index as identification information is not suited to an index used to calculate the camera position and orientation.

SUMMARY OF THE INVENTION

It is an object of the present invention to solve at least one of these problems of the prior art. According to the present invention, there is provided an information processing apparatus and an information processing method, which can identify an index detected from a sensed image more precisely.

According to an aspect of the present invention, there is provided an information processing method comprising: an image sensing step of sensing an image representing physical space; an orientation acquiring step of acquiring orientation information of an image sensing apparatus; an index detecting step of detecting an index from the sensed image; a first calculation step of calculating the first reliability of the detection result based on the image of the detected index in the sensed image; a second calculation step of calculating the second reliability of the detection result using the orientation information; and an identification step of identifying the detected index based on the first reliability and the second reliability.

According to another aspect of the present invention, there is provided an information processing apparatus comprising: an image sensing unit which senses an image representing physical space; an orientation acquiring unit which acquires orientation information of an image sensing apparatus; an index detecting unit which detects an index from the sensed image; a first computation unit which calculates the first reliability of the detection result based on the image of the detected index in the sensed image; a second computation unit which calculates the second reliability of the detection result using the orientation information; and an identification unit which identifies the detected index based on the first reliability and the second reliability.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram showing an example of the arrangement of an index identification apparatus according to the second embodiment;

FIG. 8 is a view illustrating the state of the physical space, the indices of which are identified by applying the index identification apparatus according to the second embodiment;

FIGS. 10A to 10C are views for explaining indices used in the second embodiment;

DESCRIPTION OF THE EMBODIMENTS

Preferred embodiments of the present invention will now be described in detail in accordance with the accompanying drawings.

First Embodiment

Figure 1:
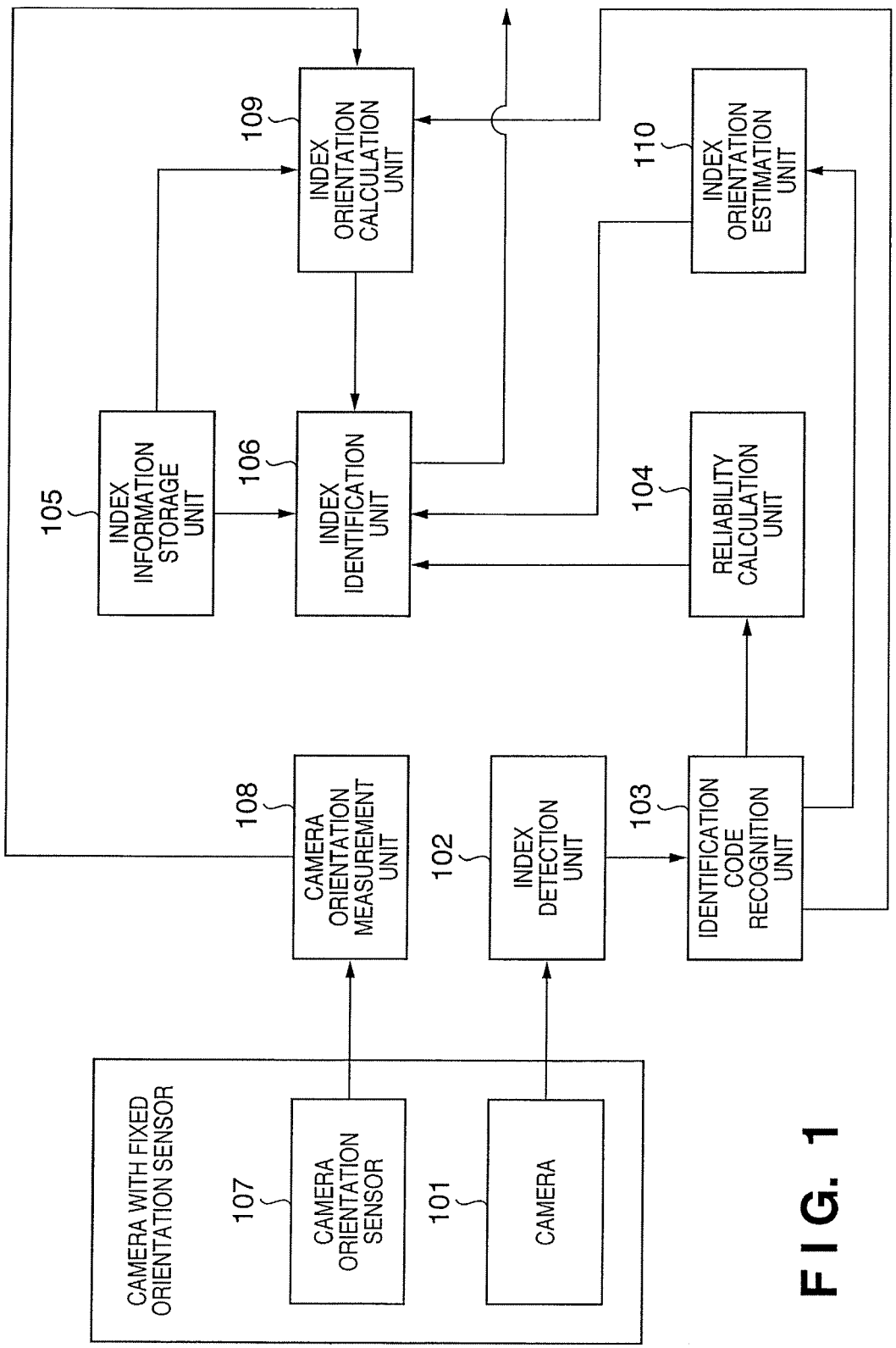
FIG. 1 is a block diagram showing an example of the arrangement of an index identification apparatus according to the first embodiment.

FIG. 1 is a block diagram showing an example of the arrangement of an index identification apparatus as an example of an information processing apparatus according to the first embodiment of the present invention.

Figure 2:
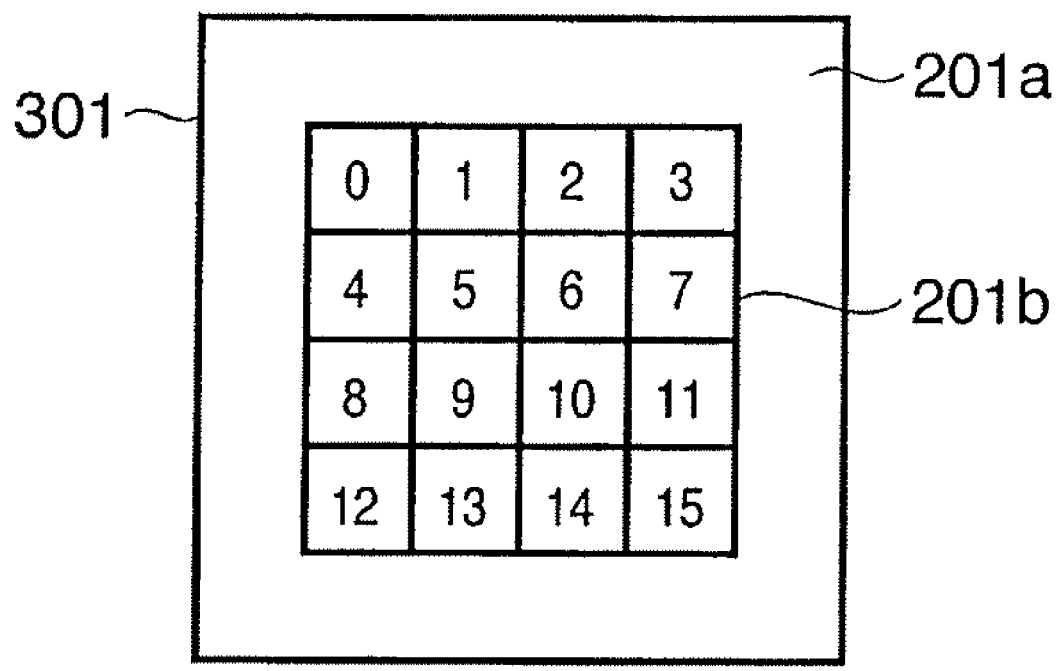
FIG. 2 and FIGS. 3A to 3C show examples of indices to be identified by the index identification apparatus according to the first embodiment.

An index to be identified by the index identification apparatus of this embodiment is located on a physical space in advance, and has identification information. As a preferred example of an index, an index 301 which has a square outer shape, and comprises a frame 201a with a color different from that of a place (background) to be located, and a 2D barcode part 201b inside the frame 201a, as shown in FIG. 2 and FIGS. 3A to 3C. The 2D barcode part 201b has 16 (=4×4) areas (bit assignment areas), as shown in FIG. 2.

Figure 4:
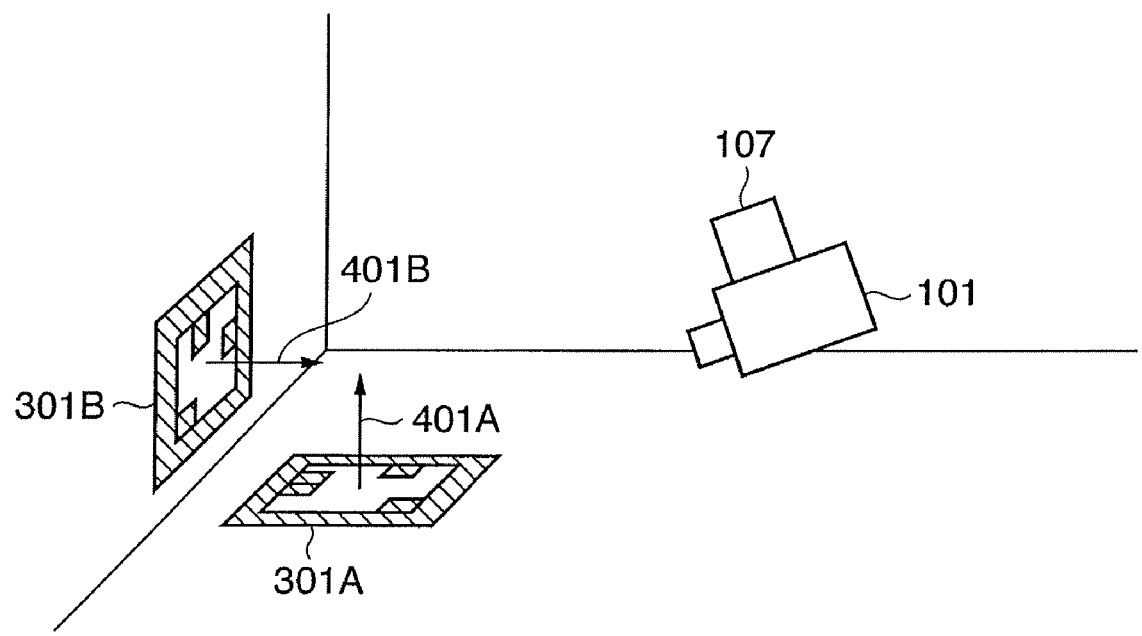
FIG. 4 is a view illustrating a state in which indices are laid out on the floor and wall on a physical space to be sensed, and are sensed by a camera 101 of the index identification apparatus in the embodiment.

FIG. 4 shows a state wherein two indices with such configuration are located as indices 301A (identification code 0) and 301B (identification code 10) on the floor and wall in the physical space to be sensed.

Of the bit assignment areas of the 2D barcode part 201b shown in FIG. 2, the areas Nos. 0, 3, 12, and 15 are used as a code for identifying rotation (directionality of the index) about a normal 401A/401B to the index as an axis. Assume that the colors of these bits are always set in the order of white, white, discriminative color from the background, and white (these 4 bits will also be referred to as a directionality specifying shape hereinafter). Other bit assignment areas are Hamming-coded, and 4 bits of the remaining 12 bits are used as check bits. That is, the number of bits which can be used as an identification code of the index is 8 (bits) except for the check bits (4 bits) and bits indicating the directionality of the index (4 bits), and 256 different identification codes can be generated.

A camera 101 can sense an image of the physical space, and is a video camera which has, for example, a CCD, CMOS sensor, or the like as an image sensing element.

An index detection unit 102 captures the sensed image of the camera 101, and detects an area which is likely to be an index (to be also referred to as a detected index hereinafter) from the image based on predetermined information such as a color, shape, and the like associated with the index.

An identification code recognition unit 103 recognizes the 4×4 2D barcode (to be simply referred to as a code hereinafter) 201b inside the detected index. The identification code recognition unit 103 detects the directionality specifying shape of the code part 201b to calculate the directionality of the index on an image plane. Furthermore, the identification code recognition unit 103 recognizes the identification code coded by the Hamming code from the remaining areas of the code part 201b.

The identification code recognition unit 103 recognizes the identification information bits and check bits from the detected index detected by the index detection unit 102. Next, the identification code recognition unit 103 calculates the identification information bits and the detected information, such as the coordinates of vertices and the like, and executes error detection processing of the identification information bits using the check bits and 1-bit correction processing, if necessary. Moreover, the identification code recognition unit 103 registers each detected index in an index candidate list.

A reliability calculation unit 104 calculates the reliability for each detected index. The reliability calculation unit 104 receives the detected information of the index from the identification code recognition unit 103. When a 1-bit error is detected and corrected, the calculation unit 104 sets reliability=0.5; when a 1-bit error is detected but is not corrected, it sets reliability=1. Also, the calculation unit 104 may set, as a reliability result, a result obtained by multiplying the reliability obtained according to the correction result by the value of a quotient Se/Sp of "the number of pixels Se included in a rectangle which represents the outer shape of the index on the image" and "the number of pixels Sp of the overall sensed image". Furthermore, the calculation unit 104 may set, as a reliability result, a result obtained by further multiplying the product by the calculation result of a quotient Le/Lp of the "the number of pixels Le of the shortest one of the four sides of the rectangle that represents the outer shape of the index on the image" and "the number of pixels Lp of the short side of the sensed image".

That is, one of
(1) the reliability determined according to the presence/absence of error correction (0.5 or 1);
(2) a value obtained by multiplying the value (1) by Se/Sp; and
(3) a value obtained by multiplying the value (2) by Le/Lp can be used as the reliability.

Note that the reliability result may comprise other combinations of these three different values (the reliability according to the presence/absence of error correction, Se/Sp, and Le/Lp) or may be other values. That is, the reliability result can be generated by using an arbitrary value which represents the degree of correct detection of identification information of an index from the sensed image.

A camera orientation sensor 107 is an orientation measurement sensor fixed to the camera 101, and uses, e.g., a gyro sensor such as InertiaCube3 available from InterSense, Inc. U.S.A., or the like in this embodiment.

A camera orientation measurement unit 108 receives the measurement value of the camera orientation sensor 107, and outputs it to an index orientation calculation unit 109.

The index orientation calculation unit 109 acquires an orientation Rwm of an index (to be referred to as index A hereinafter) corresponding to the identification code of the index detected by the identification code recognition unit 103 from an index information storage unit 105, which stores orientations of indices. Then, the calculation unit 109 calculates, using a measurement value Rwc of the camera orientation measurement unit 108, an orientation Rcm of index A on a camera coordinate system (a three-dimensional (3D) coordinate system which has the viewpoint position of the camera as an origin, and sets an image sensing plane of the camera as x-y coordinates and the visual axis of the camera as a negative vector on the z-axis). In this embodiment, assume that the location orientation Rwm of each index recorded in the index information storage unit 105 and the orientation Rwc obtained from the camera orientation measurement unit 108 are expressed by 3×3 matrices. The orientation Rcm of the index on the camera coordinate system is calculated by:

$$Rcm = Rwc^{-1} \cdot Rwm \quad (1)$$

where $Rwc^{-1}$ is an inverse matrix of Rwc.

An index orientation estimation unit 110 calculates an orientation Rcm' of the index on the camera coordinate system using the image coordinates and the direction of the vertices of the index obtained by the index detection unit 102 and the identification code recognition unit 103. A detailed method of this orientation will be described later.

An index identification unit 106 of this embodiment identifies an index based on the reliability of the reliability calculation unit 104 using a comparison result between the orientation Rcm of the index calculated by the index orientation calculation unit 109 and the orientation Rcm' of the index calculated by the index orientation estimation unit 110.

The index information storage unit 105 pre-stores information required to identify an index and to recognize its directionality for each of indices located in the physical space. More specifically, the storage unit 105 stores the location position (3D coordinates of the central point), the 3D coordinates of the vertices, the size of one side of a square, the identification code number, and the location orientation Rwm; information required to specify the directionality of the index (the coordinates of square vertices closest to the directionality specifying shape, vertex IDs, and the like); information associated with the directionality specifying shape (information associated with the shape and color); and so forth. Note that the storage unit 105 stores the values on a reference 3D coordinate system (to be referred to as a reference coordinate system hereinafter) as the position, coordinates, and the orientation of each index.

Also, the index information storage unit 105 holds a correspondence list between the 3D coordinates of the vertices of each individual index, and the 2D coordinates in the image after identification of the index, and externally outputs that list as needed. Note that registration items listed above are merely examples, and information other than those described above may be additionally registered or fewer items may be registered depending on indices and index identification methods to be used.

The index identification unit 106 performs its identification function based on the reliability calculated by the reliability calculation unit 104 so as to select and identify the index by using either the intact identification code of the detected index recognized by the identification recognition unit 103 or the verification result of verifying the identification code using the information in the index information storage unit 105. When the unit 106 identifies the index by selecting the verification result as the basis for the identification, it executes verification processing, and deletes the detected index, which is determined as a result of verification to have a wrong identification code, as a misidentified index.

Figure 6A:
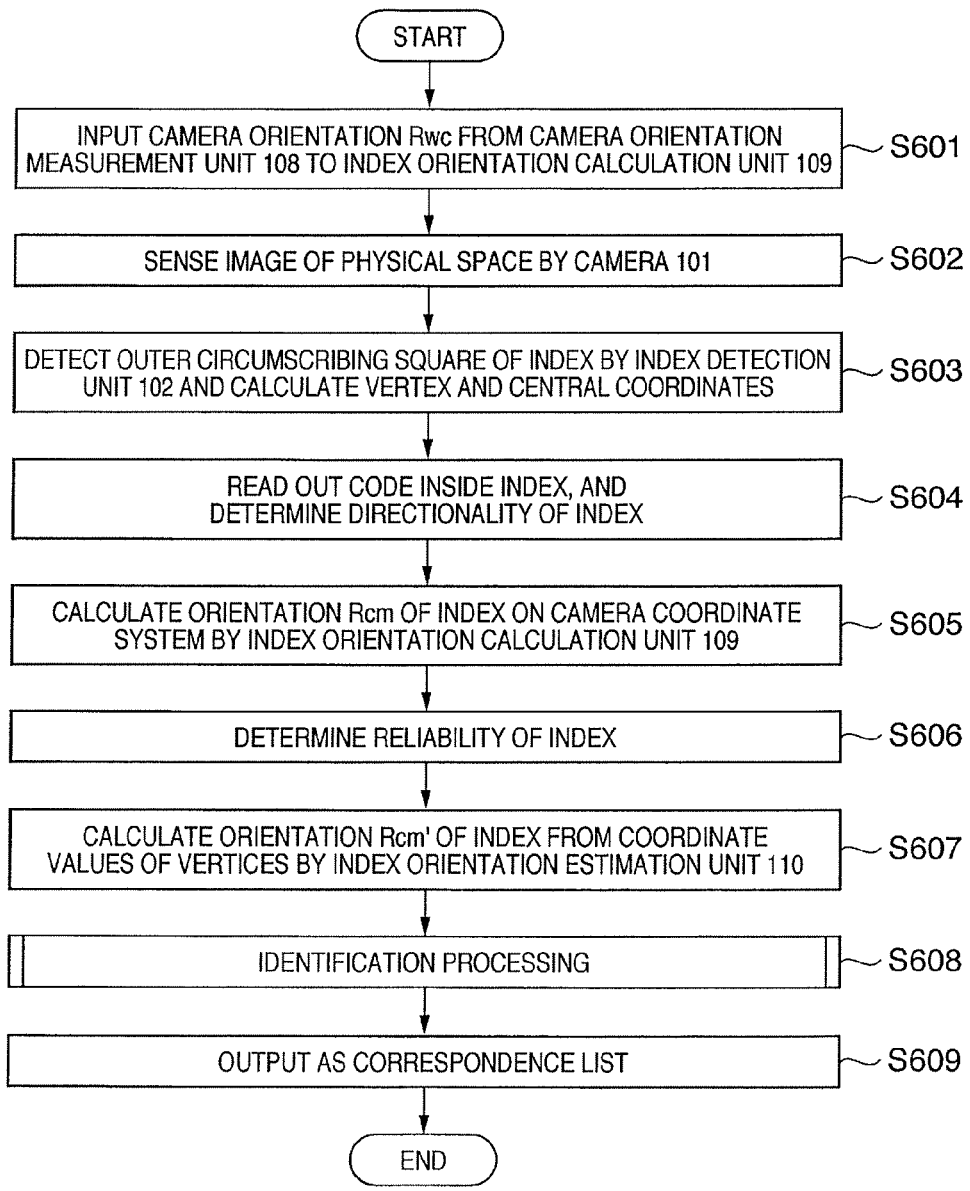
FIG. 6A is a flowchart for explaining the processing of the index identification apparatus according to the first embodiment.

FIG. 6A is a flowchart showing details of the processing of the index identification apparatus of this embodiment.

In step S601, the camera orientation sensor 107 inputs its measurement value to the camera orientation measurement unit 108, which inputs the orientation Rwc of the camera 101 on the reference coordinate system to the index orientation calculation unit 109. Note that the camera orientation Rwc obtained in step S601 may be used for purposes other than the index identification processing, such as information required to estimate the final camera position and orientation.

In step S602, the camera 101 senses an image of the physical space.

In step S603, the index detection unit 102 detects an outer circumscribing square and calculates the coordinates of the vertices and central point of the square as one process for detecting indices from the obtained sensed image. This process may use arbitrary methods. For example, the process may use the following method.

Figure 5:
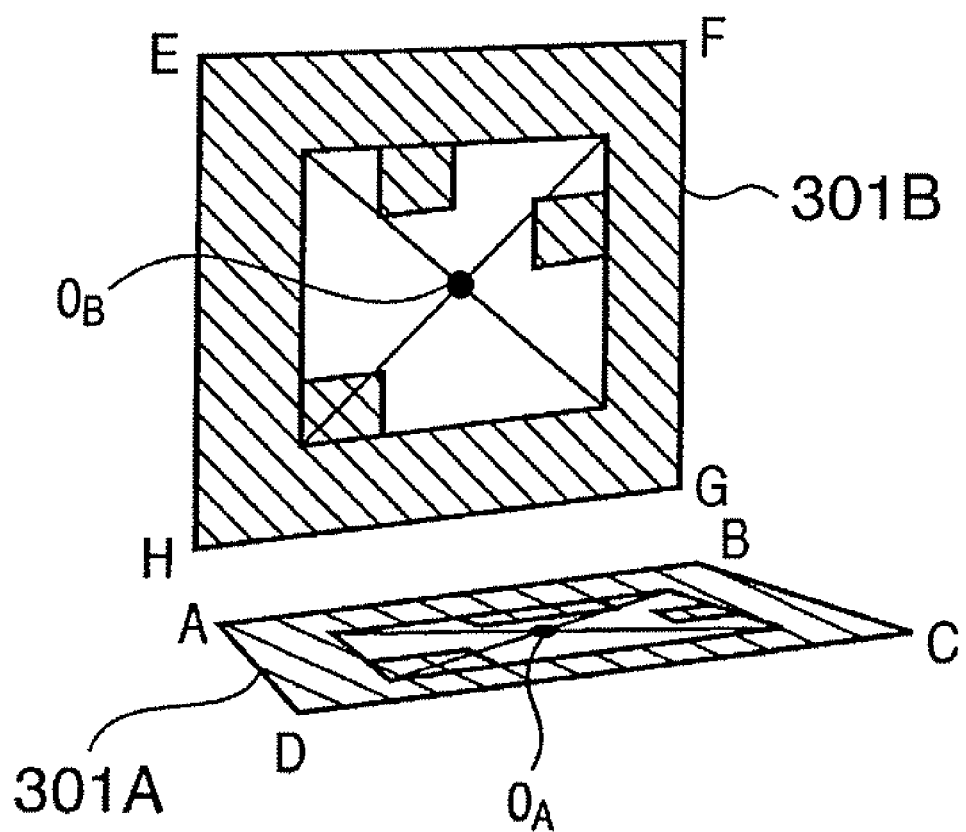
FIG. 5 shows a binarization result of the image sensed by the camera 101 in FIG. 4.

The brightness of an index is set to be different from that of the background, and after binarization based on the brightness, a contiguous region is calculated by labeling processing. FIG. 5 shows the binarization result of an image obtained by sensing the physical space having the location relationship of the camera 101 and indices 301A and 301B shown in FIG. 4. An outer circumscribing rectangle is detected by piecewise linear approximation of the label outer circumference of the contiguous region. The image coordinates of the vertices of the rectangle obtained in this manner are calculated, and those of the central point are calculated by calculating the intersection of diagonal lines.

For example, from the binary image shown in FIG. 5, the rectangle vertices and central points OA and OB of an index outer shape ABCD of the index 301A and an index outer shape EFGH of the index 301B are detected.

In step S604, the identification code recognition unit 103 acquires the central point and four vertices of a rectangular region for each of the detected indices serving as candidates of indices obtained in step S603, and reads out the code part 201b inside each index. Furthermore, the identification code recognition unit 103 refers to the four bit assignment areas closest to the vertices of the code part of the index read out in step S604. If three white areas and one black area are detected, the unit 103 considers the black position as bit assignment area No. 12, and the vertex closest to that bit assignment area as the lower left vertex of the index shown in FIG. 2.

When the identification code recognition unit 103 refers to the four bit assignment areas close to the vertices, and does not detect three white areas and one black area, it determines that an object other than the index is detected, and does not register the detected index of interest in the index candidate list. Furthermore, since the directionality of the detected index of interest is determined, the unit 103 determines the check bits (4 bits) and the identification code (8 bits) from the remaining 12 bits except for the four areas close to the vertices. Moreover, the unit 103 inspects the identification code using the check bits. At this time, if no bit error is detected, the identification code recognition unit 103 registers the detected mark of interest in the mark candidate list. If a 1-bit error is detected, the identification code recognition unit 103 corrects the corresponding bit based on the nature of a Hamming code to determine the identification code, and then registers the detected index of interest in the index candidate list. The identification code recognition unit 103 applies this processing to all the detected indices and outputs the index candidate list. In step S605, the index orientation calculation unit 109 calculates Rcm using equation (1) based on the identification code read out in step S604 for each detected index in the index candidate list, and stores the calculated value in association with each element (detected index) in the index candidate list.

In step S606, the reliability calculation unit 104 receives the error detection result of the identification code obtained by the identification code recognition unit 103 for each detected index in the index candidate list. When a 1-bit error is detected, the calculation unit 104 sets the reliability to 0.5; otherwise, it sets the reliability to 1.

Furthermore, the reliability calculation unit 104 calculates a final reliability (aforementioned reliability (3)) as the product of three values:

the reliability obtained based on the error detection result;
the value of the quotient Se/Sp of "the number of pixels Se included in the rectangle which represents the outer shape of the index on the image" and "the number of pixels Sp of the overall sensed image"; and
the value of the quotient Le/Lp of the "the number of pixels Le of the shortest one of the four sides of the rectangle that represents the outer shape of the index on the image" and "the number of pixels Lp of the short side of the sensed image", the latter two of which are calculated based on the image input from the index detection unit 102.

The calculation unit 104 then holds the calculated value of the reliability in association with each element in the index candidate list.

In step S607, the index orientation estimation unit 110 calculates a matrix Rcm' of the orientation of the detected index on the camera coordinate system from:

the 2D coordinate values of the vertices of each detected index in the index candidate list on the image, which are obtained by the index detection unit 102; and
the correspondence information of the vertices of the index obtained in step S604.

The index estimation unit 110 then holds the calculated value in association with each element in the index candidate list.

The present invention is not limited to the method of calculating the orientation on the camera coordinate system from the 2D coordinate values of the four points on the sensed image plane. For example, this embodiment adopts the method described in reference D1. That is, equations of a straight line that passes points A and B, and a straight line that passes points D and C, i.e., the straight lines of two opposing parallel sides from four vertices A, B, C, and D on the image are calculated. Then, an equation of two planes (camera coordinate system) including the two straight lines is obtained using these two straight lines and a perspective projection transformation matrix (calculated in advance) of the camera. An outer product ($N_{AB} \times N_{DC}$) of normal vectors $N_{AB}$ and $N_{DC}$ of the two planes defines a directional vector $U_1$ of the two parallel sides AB and DC on the camera coordinate system.

The same processing applies to the other pair of two opposing parallel sides BC and DA, and an outer product ($N_{BC} \times N_{DA}$) of normal vectors of two planes defines a directional vector $U_2$ of the two parallel sides DB and DA on the camera coordinate system.

Since the directional vectors $U_1$ and $U_2$ of the two neighboring sides of the index are obtained, the outer product direction of the two directional vectors is given by $V_3$. Vectors $V_1$ and $V_2$, which make right angles and have equal change angles from $U_1$ to $V_1$ and from $U_2$ to $V_2$ in a plane having $V_3$ as a vertical axis and including $U_1$ and $U_2$, are determined. At this time, $[V_1{}^tV_2{}^tV_3{}^t]$ defines the orientation Rcm' of the index on the camera coordinate system.

In step S608, the index identification unit 106 verifies an identification code using Rcm obtained in step S605, the reliability of the detected index of interest obtained in step S606, and Rcm' obtained in step S607 for each detected index in the index candidate list. This processing corresponds to identification of the index. The detected index which is determined to be a mismatch is deleted from the index candidate list.

In step S609, the information of each detected index in the index candidate list obtained as a result of the above processing is recorded in the correspondence list in the index information storage unit 105. Also, that information is externally output via an I/F (not shown). Note that the information of the detected index includes the identification code, the 2D image coordinate values of the respective vertices of the index obtained in step S604, and the 3D coordinate values of the vertices in the index information storage unit 105.

Figure 6B:
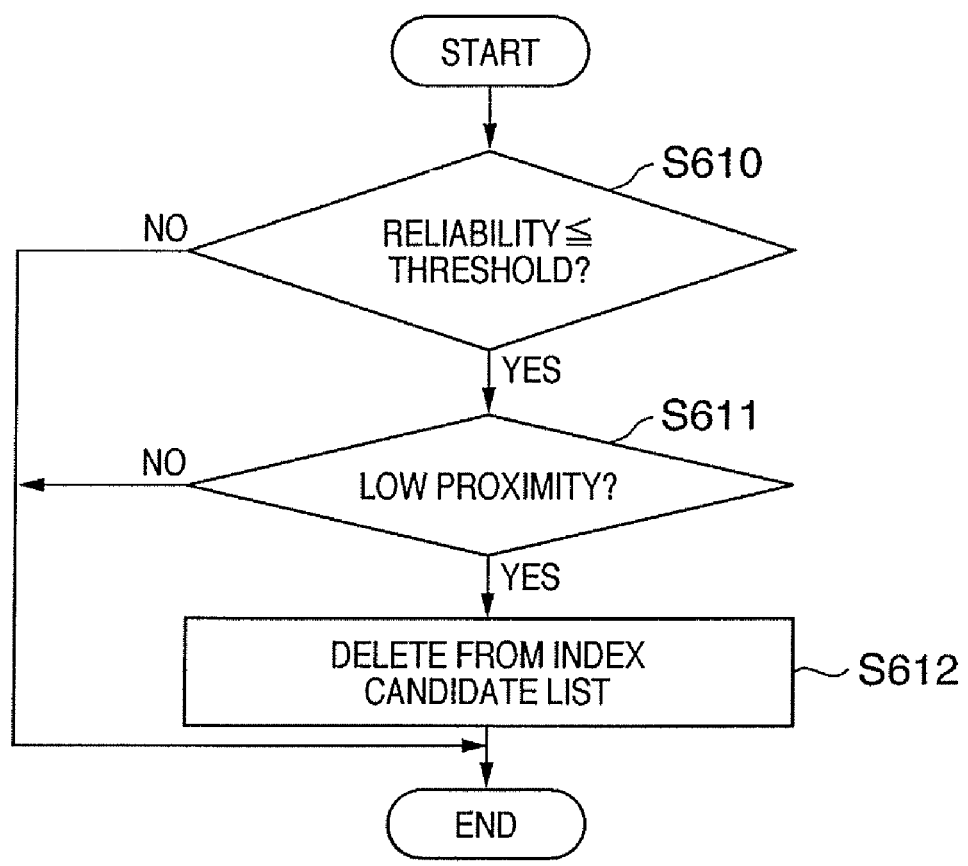
FIG. 6B is a flowchart for explaining the processing in step S608 of FIG. 6A.

Details of step S608 as the identification processing in the index identification unit 106 will be described below using the flowchart shown in FIG. 6B.

The index identification unit 106 according to this embodiment performs the verification process based on the relative orientation relationship between the camera and index, whether or not the index identified based on the image information is truly that index (whether or not a wrong identification code is readout). Furthermore, the processing branches according to the reliability so as to prevent the index to be originally identified (the index 301B in case of FIG. 4) from being not identified due to output errors of the camera orientation sensor 107 used to identify the index.

Since an orientation sensor such as InertiaCube2 or the like has drift errors accumulated with an elapse of time, the orientation measurement value to be output may often indicate an orientation having errors, which is different from the true orientation. For this reason, when the orientation is checked based on the measurement value of the orientation sensor irrespective of the reliability, the detected index to be originally identified may not be identified due to the influence of errors of the orientation sensor.

On this point, the index identification method according to this embodiment can correctly identify the index without being influenced by errors of the orientation sensor since it does not compare the orientation of the index with a high reliability and trusts in the code (identification code) detected and identified from the sensed image. By determining whether or not to execute verification of the identification information based on the reliability, the processes for correctly identifying the index are executed in the steps to be described below.

In step S610, the index identification unit 106 determines processing to be applied to the detected index of interest according to the reliability of the index with reference to the reliability of the detected index of interest. If the reliability of the index is equal to or lower than a predetermined threshold, the unit 106 determines that the identification code is likely to be wrong, and the process advances to step S611. On the other hand, if the reliability of the index is higher than the threshold, the unit 106 ends processing since it determines that the identification is sufficiently trustworthy.

In step S611, the index identification unit 106 checks the proximity between the orientation Rcm' of the index on the camera coordinate system obtained in step S607, and the orientation Rcm of the index obtained in step S605. If the proximity is high, the unit 106 determines that the identification code of the index recognized in step S604 is correct, and ends processing.

On the other hand, if the proximity is low, the index identification unit 106 determines that the identification code of the index recognized in step S604 is wrong, and deletes the detected index of interest from the index candidate list in step S612.

The index identification unit 106 applies the aforementioned processing to respective detected indices in the index candidate list.

Note that the proximity discrimination method of the orientations executed in step S611 is not particularly limited. For example, a rotating matrix that transforms from Rcm to Rcm' may be calculated and further transformed to the rotation axes and rotation angles, and if the difference between the magnitudes of the rotation angles is equal to or lower than a threshold, it may be determined that the proximity is high. Alternatively, Rcm and Rcm' may be transformed into quaternion expressions, and if the distance between points on a four-dimensional spherical plane is equal to or lower than a threshold, it may be determined that the proximity is high. Alternatively, if the distance between singular value vectors obtained by applying singular value decomposition to Rcm and Rcm' is equal to or lower than a threshold, it may be determined that the proximity is high, or whether or not $Rcm \cdot Rcm^{-1}$ is close to a unit matrix may be evaluated.

This embodiment calculates the orientations Rcm and Rcm' of the index on the camera coordinate system in steps S607 and S605, respectively, and compares them with each other in step S611. However, the orientation of the index on the camera coordinate system need not be used as long as a method of comparing the orientation of the index defined in the index information storage unit 105 with the detected orientation is available.

Figure 3C:
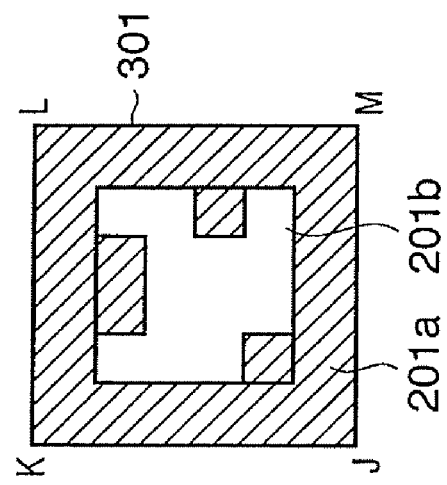
Figure 3B:
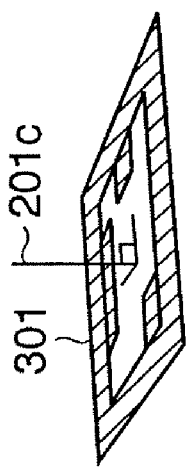
Figure 3A:
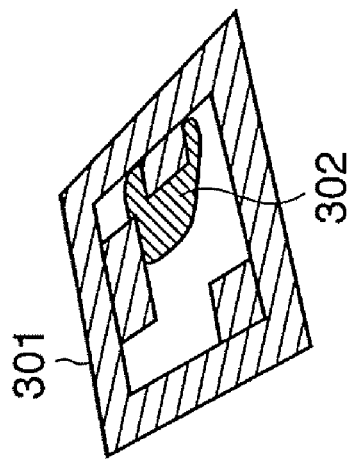

For example, an index coordinate system which has an index as a criterion (for example, an orthogonal coordinate system which has vertex J in FIG. 3A as an origin, vector JK as an X-axis, a normal direction as a Y-axis, and vector JM as a Z-axis) is defined. Orientations Rmc of the camera on the index coordinate system may be calculated in steps S605 and S607 and may be compared with each other. In this case, in step S605 a target orientation Rmc is obtained by calculating $Rcm^{-1}$. Note that $Rcm^{-1}$ represents an inverse matrix of the index orientation Rcm on the camera coordinate system. In step S607, an inverse matrix $Rcm'^{-1}$ of Rcm' is calculated.

Alternatively, the camera orientation Rwc on the reference coordinate system may be used as a comparison criterion. In step S605, the camera orientation calculated based on the sensor measurement value is used. In step S607, $Rwc' = Rwm \cdot Rcm'^{-1}$ is calculated. Note that Rwm is the orientation of the index recorded in the index information storage unit 105.

Even when the same processing as in step S611 is applied to the detected index with a high reliability, and the orientations do not match, it may be determined that the camera orientation sensor 107 suffers an error, and a warning may be generated for the user.

As described above, according to this embodiment, the identification information of the index is verified using the orientation information of the index in the index information storage unit 105, and that of the camera 101 obtained from the camera orientation sensor 107 as means other than the 2D image processing. Therefore, misidentification that may occur upon identifying depending only on information obtained from the sensed image can be avoided. Also, the reliability of information obtained from the sensed image is calculated using the lengths of index vertices detected in the sensed image, the number of pixels inside the detected index on the image, and the check bits of the code part encoded by a Hamming code in a multiple manner. In this manner, the reliability of the reliability as information for making a decision improves. Furthermore, whether or not to execute the verification processing of the identification code is determined based on the reliability. Hence, even when the camera orientation measurement value used in identification has suffered errors, the index which is detected correctly can be avoided from being deleted as a misidentified index.

Second Embodiment

In the first embodiment, identification information is verified or corrected using an index having an identification code encoded by a Hamming code in its code part. However, it is not indispensable to encode the identification code by the Hamming code, and the identification code may be encoded by other methods. In brief, any other indices may be applied without any specific limitations as long as they have information required to identify a plurality of indices.

For example, an index, a code part of which includes a one-dimensional (1D) barcode encoded by a gray code, may be used. This embodiment will describe a method of preventing misidentification of indices using indices encoded by the gray code and data which records identification information of the indices which are located in advance on a space.

FIG. 7 is a block diagram showing an example of the arrangement of an index identification apparatus according to this embodiment. The same reference numerals in FIG. 7 denote components similar to those in the first embodiment.

This embodiment is characterized by using an index whose identification code can be identified from image information. As described above, as an example of a preferred index, this embodiment uses a square-shaped index which has a gray code as an identification code, as shown in FIGS. 10A to 10C.

More specifically, as shown in FIG. 10B, this embodiment uses an index:

which has four bit assignment areas 0 to 3 (803) that form a code part in a region of a square 801 (the region 801 is to be referred to as an index outer shape hereinafter) with a color whose brightness is largely different from the background and are used to locate a 4-bit gray code; and which has a square 802 (to be referred to as a directionality specifying shape) that indicates the directionality of the index on the space and is located near one vertex of the index outer shape so as to be recognized independently from the index outer shape.

This index is configured by the vertices of the square of the index outer shape 801, the internal 4-bit identification code, and the directionality specifying shape 802 that uniquely determines the upper, lower, right, and left directions. In this embodiment, the directionality specifying shape 802 is a square which has, as the length of one side, ⅙ one side of the square of the index outer shape 801. By registering the positional relationship between the index outer shape 801 and the directionality specifying shape 802 in an index information storage unit 105 together with the location of the index, the identification code of the index can be read out based on the coordinate information of the index on the image. Furthermore, using the identification code of the detected index, the detected index in the sensed image can be identified from the plurality of indices located in the physical space.

Note that the identification codes which have differences equal to or larger than 2 of 16 different identification codes 0 to 15 must be selected and located on the space. For example, upon locating identification code No. 0, Nos. 1 and 2 are not used, and No. 3 and subsequent numbers must be selected to form differences equal to or larger than 2 between neighboring identification codes. Due to this limitation, the maximum of six different indices can be located on the space.

The gray code located inside the index of this embodiment is a code for identification, which is a code pattern shown in a gray code table of FIG. 10C. This gray code is characterized in that since the Hamming distance between neighboring codes becomes 1, the difference between a correct code and wrong code is likely to be 1 even when the spatially neighboring codes are misread on the image upon recognizing the identification codes. That is, upon correcting a code, the code is likely to be corrected since a neighboring code is selected as a correct identification code. Details of code correction processing will be described later.

In the code table shown in FIG. 10C, respective columns (0 to 3) represent bit patterns (0 (black)/1 (white)) of codes, and rows (0 to 15) represent 16 different codes. Columns 0 to 3 correspond to bit assignment areas 0 to 3 in FIG. 10B, and a code in the example of the gray code marker shown in FIG. 10A indicates an identification code "6" since it includes white, black, white, and black (pixel values 1, 0, 1, and 0).

A camera 101 provides functions equivalent to those of the first embodiment.

An index detection unit 102 has functions equivalent to those of the first embodiment, and extracts a candidate region of an index from the sensed image.

An identification code recognition unit 103 in this embodiment calculates the directionality of the index by detecting the directionality specifying shape located near the detected index, and also recognizes an identification code coded by a gray code inside the index. The detailed recognition processing sequence will be described later.

A reliability calculation unit 104 calculates the reliability of the recognition result of the identification code. Whether or not to execute processing for correcting the identification code is determined based on this reliability. This embodiment calculates the reliability by calculating a ratio between the number of pixels Le of the shortest one of the four sides of the detected index on the sensed image and the number of pixels Lp (480 in case of the sensed image having a resolution of 640 pixels×480 pixels) of the short side of the sensed image. Details of the calculation processing of the reliability will be described later.

An index information storage unit 105 has functions equivalent to those in the first embodiment, and inputs/outputs location information of indices and the like as needed.

An index identification unit 106 determines, based on the reliability calculated by the reliability calculation unit 104, whether the identification code of the detected index is used intact or the identification code is used after it is corrected using information in the index information storage unit 105.

Upon selecting correction, the index identification unit 106 executes correction processing to obtain the corrected identification code. The index identification unit 106 identifies the detected index based on the finally determined identification code. When the reliability calculated by the reliability calculation unit 104 is lower than a predetermined threshold, the index identification unit 106 compares the identification code number input from the index information storage unit 105 with the identification code number obtained based on the detected index, and selects an identification code with a minimum difference therebetween. Details of selection of processing based on the reliability and the index identification processing will be described later.

Note that the combination of identification code recognition unit 103, the reliability calculation unit 104, and the index identification unit 106 will be referred to as an identification module 707 hereinafter.

FIG. 8 illustrates a state of the physical space on which the indices are identified by applying the index identification apparatus of this embodiment. As shown in FIG. 8, two indices 801A and 801B are respectively located on the floor and wall of the physical space, and the index information storage unit 105 records information such as the sizes, locations (positions and orientations on a reference coordinate system), and the like of these indices. The camera 101 is free to move. In FIG. 8, the camera 101 is located at a position opposing the index 801B having a normal 901B, and a normal 901A to the index 801A and a visual axis 101A of the camera 101 make an angle close to 90°.

Figure 11:
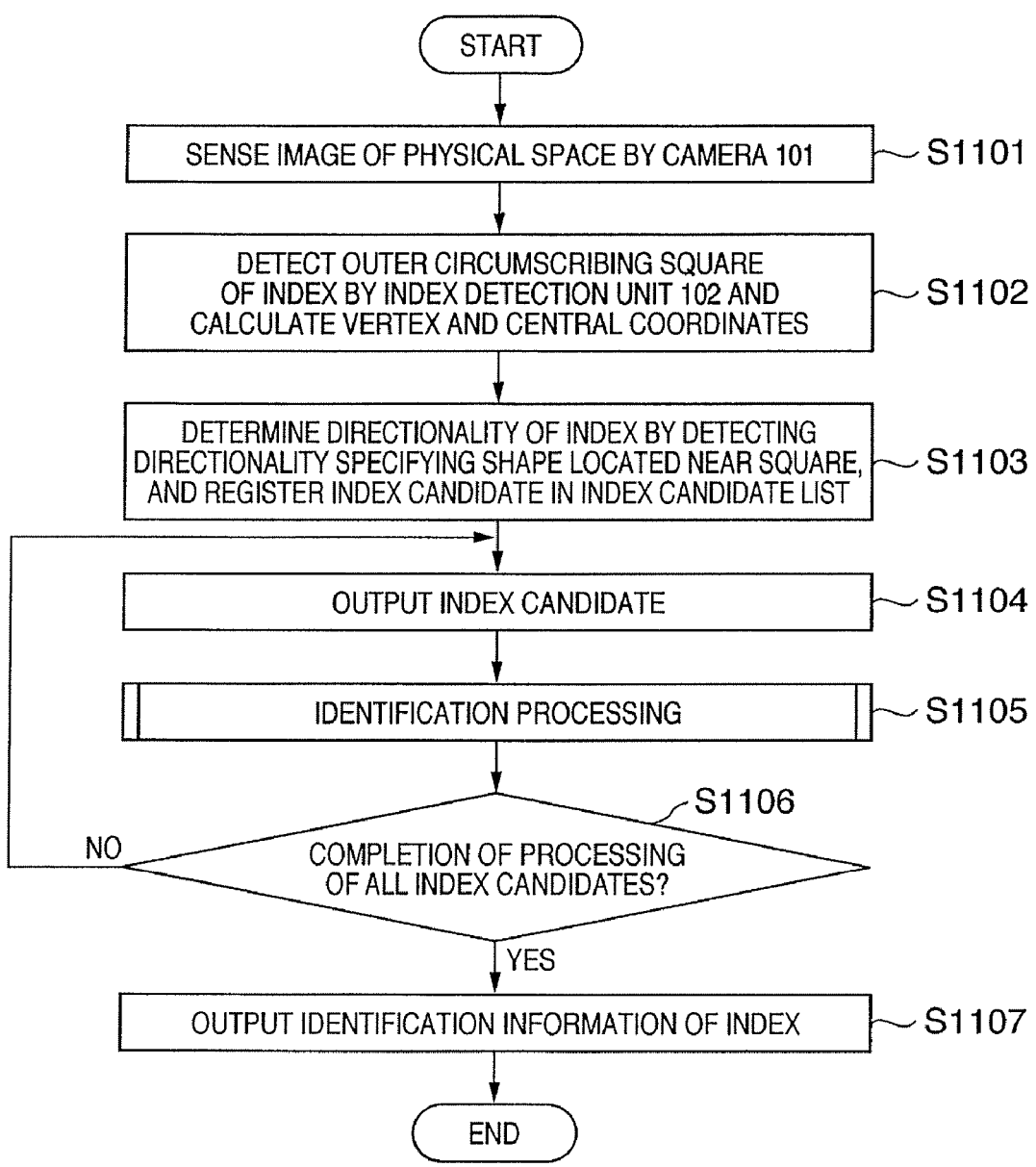
FIG. 11 is a flowchart for explaining the processing of the index identification apparatus according to the second embodiment.

The processing to be executed by the index identification apparatus with the above arrangement will be described below with reference to the flowcharts shown in FIGS. 11 and 12.

In step S1101, the camera 101 senses an image of the physical space.

In step S1102, the index detection unit 102 generates a binary image to detect an outer circumscribing square, and calculates the coordinates of the vertices and central point of the square as one process for detecting indices from the obtained sensed image as in step S603 in the first embodiment.

Figure 9:
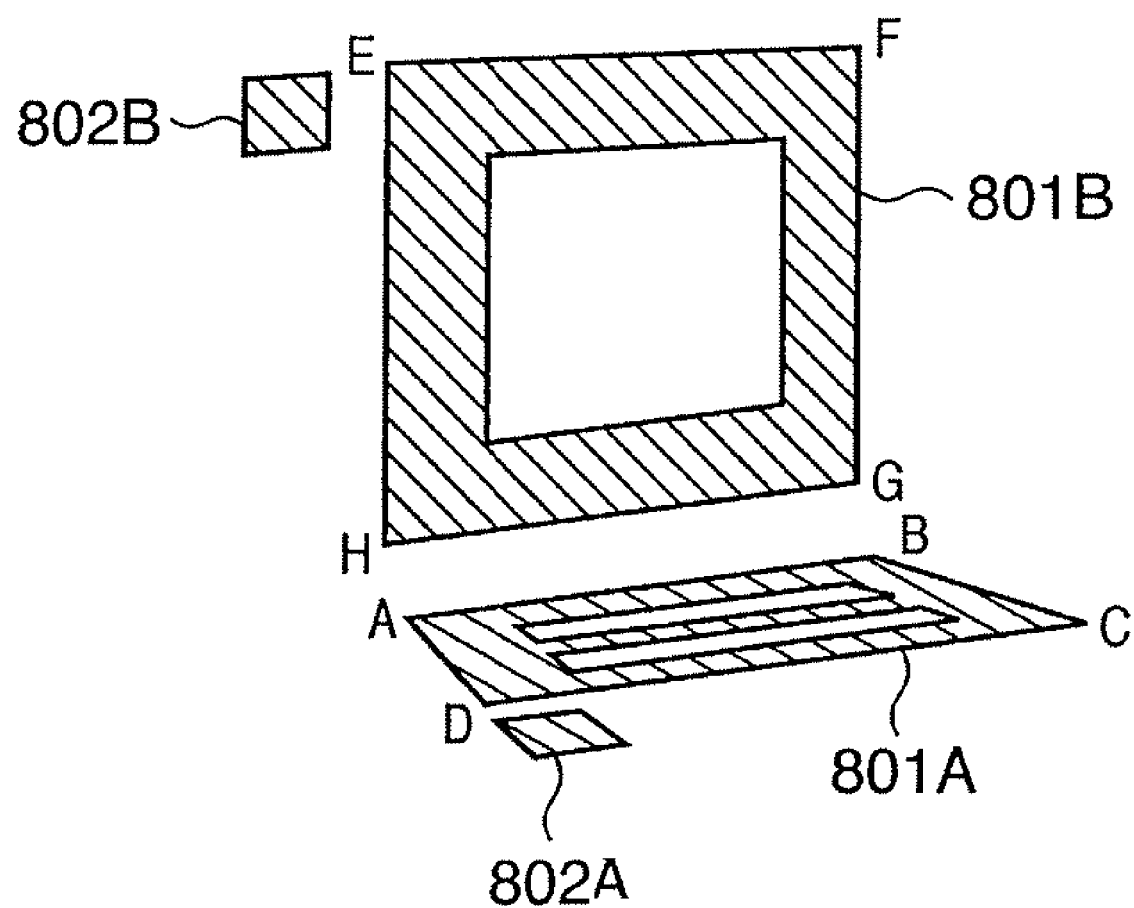
FIG. 9 shows a binarization result of the image sensed by a camera 101 in FIG. 8.

For example, from a binary image shown in FIG. 9, the index detection unit 102 detects the vertices and central points of rectangles including index outer shape ABCD of the index 801A, a directionality specifying shape 802A of the index 801A, index outer shape EFGH of the index 801B, and a directionality specifying shape 802B of the index 801B.

In step S1103, the index detection unit 102 determines the directionality of each index by confirming if the directionality specifying shape exists near the vertex of each square obtained in step S1102 as the next process of index detection, and registers the directionality in an index candidate list. For example, the index outer shape and the directionality specifying shape may be associated with each other using the distance between the central points of respective rectangles, the ratio of the lengths of the two sides on the same straight line, the ratio of the numbers of pixels in the rectangles, and the like.

In this way, the index detection unit 102 registers, as one set, "the image coordinate values of the vertices of the square index", "the image coordinate value of the central point of the square index", and "information of the vertex position, which has a closest distance to the directionality specifying shape" of each index outer shape associated with the directionality shape in the index candidate list. For example, the index detection unit 102 registers, from the binary image of FIG. 9, "the image coordinate values of vertices A, B, C, and D of the index 801A, the image coordinate value of the central point of the index 801A, and vertex D" and "the image coordinate values of vertices E, F, G, and H of the index 801B, the image coordinate value of the central point of the index 801B, and vertex E" in the index candidate list.

In step S1104, each index candidate in the index candidate list obtained in step S1103 is individually output to the identification module 707.

In step S1105, the identification module 707 applies code pattern recognition and identification processing to each index candidate detected from the sensed image. Details of the code pattern recognition and identification processing will be described later.

If it is determined in step S1106 that the index candidates which are to undergo the identification processing still remain in the index candidate list, the process returns to step S1104. If the identification processing of all the index candidates is complete, the process advances to step S1107.

In step S1107, the index identification unit 106 outputs the identification information recorded in the index information storage unit 105, thus ending the processing.

Figure 12:
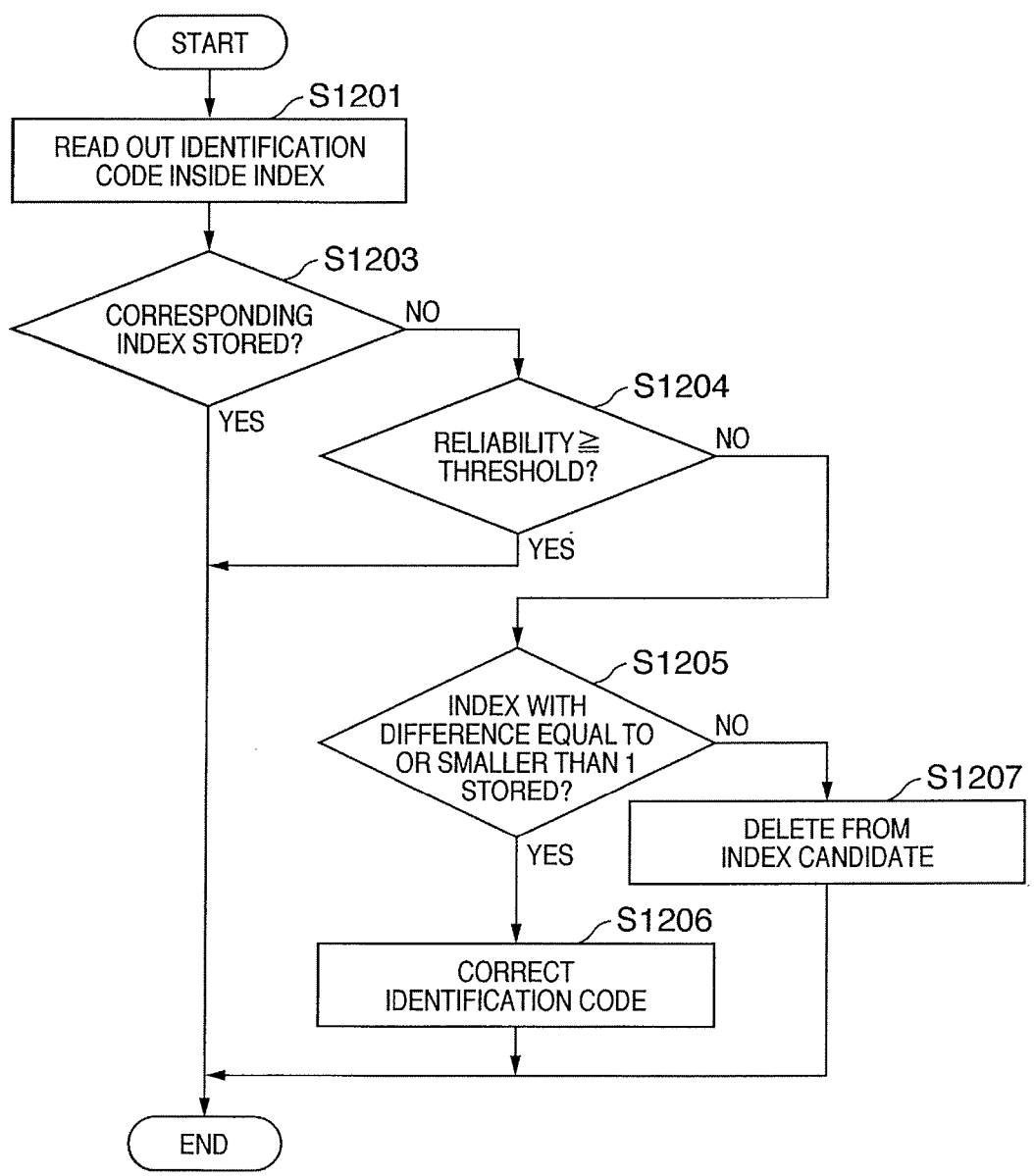
FIG. 12 is a flowchart showing details of the recognition and identification processing to be executed by an identification module 707 in the second embodiment.

FIG. 12 is a flowchart showing details of the recognition and identification processing (step S1105 of the flowchart of FIG. 11) to be executed by the identification module 707 of this embodiment.

In step S1201, the identification code recognition unit 103 reads out (recognizes) an identification code from the code part of the detected index input from the index detection unit 102.

Figure 13:
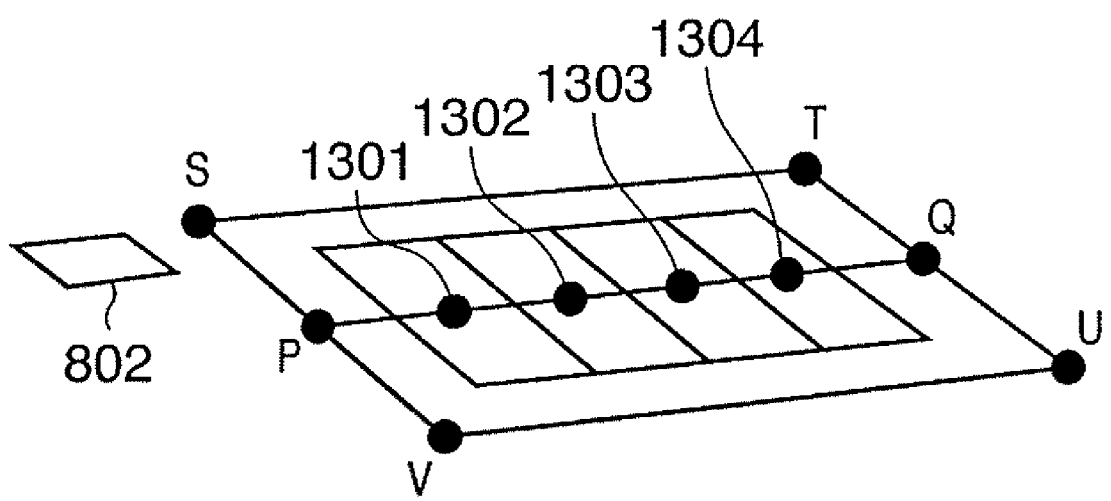
FIG. 13 is a view for explaining identification code recognition processing according to the second embodiment.

FIG. 13 is a view for explaining the code recognition processing of the identification code recognition unit 103. Let S be the vertex closest to the directionality specifying shape of the four vertices of the index candidate of interest, and assign T, U, and V in turn clockwise to the remaining vertices. Furthermore, calculate the middle points of SV and TU, and set them as P and Q. The pixel value (0 or 1) at a point 1301 which divides line PQ to 3:9 is read out, and is set as a bit value of bit assignment area 0 in FIG. 10B. Likewise, the pixel values at a point 1302 which divides line PQ to 5:7, a point 1303 which divides line PQ to 7:5, and a point 1304 which divides line PQ to 9:3 are respectively set as the values of bit assignment areas No. 1, No. 2, and No. 3 in FIG. 10B. The bit sequence assigned in this way is applied to the gray code table in FIG. 10C, thus recognizing an identification code.

The index identification unit 106 checks in step S1203 if a plurality of identification codes stored in the index information storage unit 105 include one that matches the identification code obtained in step S1201. If an identical identification code is found, the index identification unit 106 determines that the identification code obtained in step S1201 is not misrecognized. The index identification unit 106 records the vertex coordinates of the index of interest on the image in a correspondence list of the index information storage unit 105 in association with the 3D coordinate values of the vertices of the index whose identification code is a match in the index information storage unit 105. If the identification codes stored in the index information storage unit 105 do not include any one which matches the identification code obtained in step S1201, the process advances to step S1204.

In step S1204, the reliability calculation unit 104 detects the lengths of the four sides of the square index (note that the index appears as a rectangle in place of a square in the image) on the image. Furthermore, the reliability calculation unit 104 calculates the length of the shortest side of one index to calculate the quotient Le/Lp of the length Le (the number of pixels) of the shortest side and the number of pixels Lp (480 in case of the sensed image having a resolution of 640×480 pixels) of the short side of the sensed image, and sets that quotient as the reliability of the index candidate of interest.

Furthermore, the reliability calculation unit 104 checks if the reliability is equal to or higher than a threshold. If the reliability is equal to or higher than the threshold, the reliability calculation unit 104 determines that the identification code is sufficiently reliable. The reliability calculation unit 104 records the vertex coordinates of the index of interest on the image in the correspondence list of the index information storage unit 105 in association with the 3D coordinate values of the vertices of the index whose identification code is a match in the index information storage unit 105. On the other hand, if the reliability is lower than the threshold, the reliability calculation unit 104 determines that the identification code is likely to be misrecognized, and the process advances to step S1205.

The index identification unit 106 calculates the differences between the identification code obtained in step S1201 and a plurality of identification codes stored in the index information storage unit 105 and checks in step S1205 if there is a code which has the absolute value of the difference (to be referred to as a difference hereinafter)=1. The reason why the index identification unit 106 checks the code difference is to apply correction using a feature of a gray code which has a difference=1 from a correct identification code even when the code is misrecognized due to quantization errors and the like. That is, if the index information storage unit 105 stores a (neighboring) identification code which has a difference=1 from the identification code obtained in step S1201, that code is likely to be a correct identification code.

For this reason, if the index information storage unit 105 stores the neighboring identification code which has a difference=1, the index identification unit 106 corrects the identification code of the index candidate of interest to the value of the identification code which is determined in step S1205 as a neighboring identification code and is stored in the index information storage unit 105 in step S1206. Furthermore, the index identification unit 106 records the vertex coordinates of the index candidate of interest on the image in the correspondence list of the index information storage unit 105 in association with the 3D coordinate values of the vertices of the index whose identification code is a match in the index information storage unit 105. If an identification code whose difference is 1 is not found in step S1205, the index identification unit 106 determines that the identification code cannot be verified and corrected, and the process advances to step S1207.

In step S1207, the index identification unit 106 deletes the index candidate of interest from the index candidate list, thus ending the processing.

The processing in steps S1201 to S1207 will be described in more detail below using the binary image shown in FIG. 9 and FIG. 11. The identification module 707 individually receives the detected information of the projected images of the indices 801A and 801B stored in the index candidate list.

In case of the index 801B, assume that the identification code recognition module 107 reads out "1111" in step S1201 as the pixel values of the points 1301, 1302, 1303, and 1304 shown in FIG. 13, and correctly identifies that code as an index with an identification code "0". In step S1203, the index identification unit 106 confirms that the index information storage unit 105 stores an index corresponding to the identification code "0" obtained in step S1201. The index identification unit 106 registers information of the detected index with the identification code "0" and index information with the identification code "0" in the index information storage unit 105 in the correspondence list. That is, it is identified that the projected image of the index 801B as the index candidate detected from the image in FIG. 9 is that of the index 801B having the identification code "0".

In case of the index 801A as well, the identification code recognition module 107 reads out a code in step S1201 as in the index 801B. However, the index 801A is in a state in which an angle the normal to the index makes with the visual axis of the camera is close to 90°. For this reason, as has been described in the paragraphs of "Description of the Related Art", the identification code recognition module 107 misrecognizes the pixel values at the points 1301 to 1304 shown in FIG. 13 as "1000" (identification code "5") although it should originally recognize them as "1010" (identification code "6").

Conventionally, the index 801A is recognized as that having the identification code "5" at that time. However, since the index information storage unit 105 does not store index information having the identification code "5", that index cannot be identified. Therefore, the index 801A is not handled as that used to obtain the camera position and orientation. For this reason, the camera position and orientation cannot be calculated consequently, or the estimation precision of the position and orientation lowers.

By contrast, the index identification unit 106 of this embodiment confirms the reliability of recognition of the identification code by inquiring the reliability calculation unit 104 of it and attempts to correct the identification code in the processing in step S1203 and subsequent steps.

The index identification unit 106 checks in step S1203 if the index information storage unit 105 stores the identification code "5" detected from the image. As shown in FIG. 8, the index information storage unit 105 stores in advance the information of the index 801A (identification code "6") and index 801B (identification code "0") which are located on the space. Since the index information storage unit 105 does not store the identification code "5" obtained in step S1201, the process advances to step S1204.

In step S1204, the reliability calculation unit 104 detects the lengths (the numbers of pixels) of four sides AB, BC, CD, and DA of the index 801A shown in FIG. 9. The reliability calculation unit 104 then stores, as reliability, a quotient 0.08 obtained by dividing the length (e.g., 40 pixels) of side DA as the shortest length by the number of pixels (e.g., 480 pixels) of the short side of the sensed image. Then, the processing branches according to the reliability. If a threshold which is set in advance is, e.g., 0.1, it is determined that the reliability is lower than the threshold, and the process advances to step S1205. The practical value of the threshold may be determined in accordance with the type of index and the like.

In step S1205, the index identification unit 106 checks the presence/absence of an index having an identification code, which has a difference=1 from the identification code "5" obtained in step S1201. Assuming that the index identification unit 106 detects that the index information storage unit 105 stores index information having an identification code "6", it corrects the identification code "5" obtained in step S1201 to an identification code "6" in step S1206. Furthermore, the index information storage unit 105 associates the index using the corrected identification code "6".

A case will be examined below wherein new index N having an identification code "5" is located in addition to the indices 801A and 801B, and its image appears in the sensed image reliably so that its identification code is not misrecognized. At this time, if the identification code of index N is correctly recognized as "5", it is determined as a result of collation with the identification codes of indices held in the index information storage unit 105 that a corresponding index does not exist.

If the processing which does not branch depending on the reliability in step S1204 and applies correction processing (steps S1205 and S1206) to all index candidates is adopted, the identification code "5" is unwantedly corrected to "6" although it is correctly recognized. That is, misidentification occurs. By contrast, since the index identification processing according to this embodiment makes a decision that correction is not applied to the index with a high reliability, the correction processing of the identification code is not applied to index N whose image is sensed reliably.

Note that this processing may detect the identification code "5" of index N neighbors the identification code "6" of the index 801B held by the index information storage unit 105, and may output a warning indicating that "when the reliability of index N becomes low, misidentification is likely to occur".

That is, even when the reliability is high, the processing in step S1205 is executed, and if an index having a difference equal to or smaller than 1 is found, the aforementioned warning may be output in place of correction in step S1206.

As described above, according to this embodiment, misrecognized identification information is corrected using the characteristics of the gray code and information of indices in the index information storage unit 105 are used as means other than the 2D image processing, thus avoiding misidentification. Also, the reliability is calculated using the length Le of the shortest side of the detected index, and the index is identified using the identification information intact for the index candidate which is determined to have a high reliability. On the other hand, for an index candidate which is determined to have a low reliability, the identification code of the index is corrected and identified using the information of an index in the index information storage unit 105 and the characteristics of the gray code. In this manner, whether or not the correction processing of an identification code is executed is determined according to the reliability using the means other than the 2D image processing, and an index can be identified more correctly.

<First Modification>

In the above embodiments, the orientation of the camera is measured using a gyro sensor, and is used as a part of information required to verify the identification information of an index. However, use of the gyro sensor is not indispensable in the present invention, and arbitrary means other than the 2D image processing that avoids misidentification can be applied.

For example, a 6-degrees-of-freedom sensor such as a magnetic sensor or the like may be attached to the camera in place of the gyro sensor. In this case, indices are projected onto a sensed image based on the location information of indices on the space using the camera measurement value of the 6-degrees-of-freedom sensor, and the ways of appearance, i.e., the positions, directions, sizes, and the like of the projected image and real image are compared to verify identification information of each index.

In this way, when misidentification occurs by only the 2D image processing, since the identification information is verified by the means other than the 2D image processing, misidentification can be eliminated. Since an index which has a high reliability calculated upon detecting that index from the sensed image is used intact without verifying its identification information, misidentification due to errors of the magnetic sensor can also be eliminated.

Figure 14:
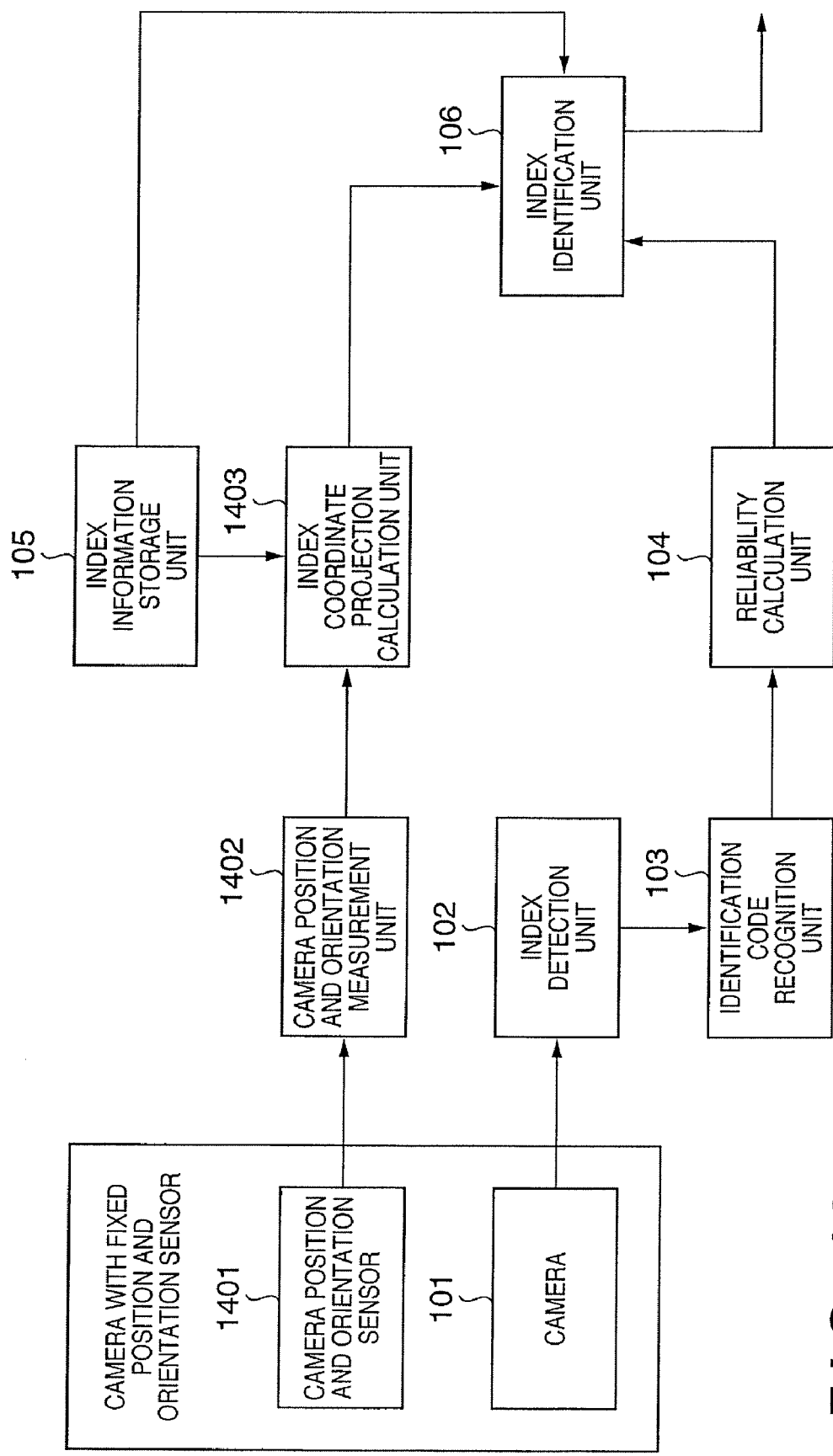
FIG. 14 is a block diagram showing an example of the arrangement of an index identification apparatus according to the first modification.

FIG. 14 is a block diagram showing an example of the arrangement of an index identification apparatus according to this modification. The same reference numerals in FIG. 14 denote components similar to those in the block diagram of FIG. 1.

A camera position and orientation sensor 1401 is a 6-degrees-of-freedom sensor which is attached to the camera 101, and adopts FASTRAK available from Polhemus in this modification.

A camera position and orientation measurement unit 1402 outputs the camera position and orientation obtained from the camera position and orientation sensor 1401 to an index coordinate projection calculation unit 1403.

The index coordinate projection calculation unit 1403 calculates the projected position of an index, which is likely to be sensed by the camera 101, on the image plane of the camera 101 based on the position and orientation values of the camera 101 and 3D coordinate information of the index recorded in the index information storage unit 105. An index projected onto the image plane (to be also referred to as an image sensing plane hereinafter) will be referred to as a projected index hereinafter.

The index identification unit 106 of this modification identifies an index by comparing the image coordinates of the central point of the index detected from the image and its directionality on the image, and the central point of the projected index and its directionality on the image obtained by the index coordinate projection calculation unit 1403 based on the reliability calculated by the reliability calculation unit 104.

Since other blocks have functions equivalent to those of the first embodiment, a description thereof will be omitted.

Figure 15A:
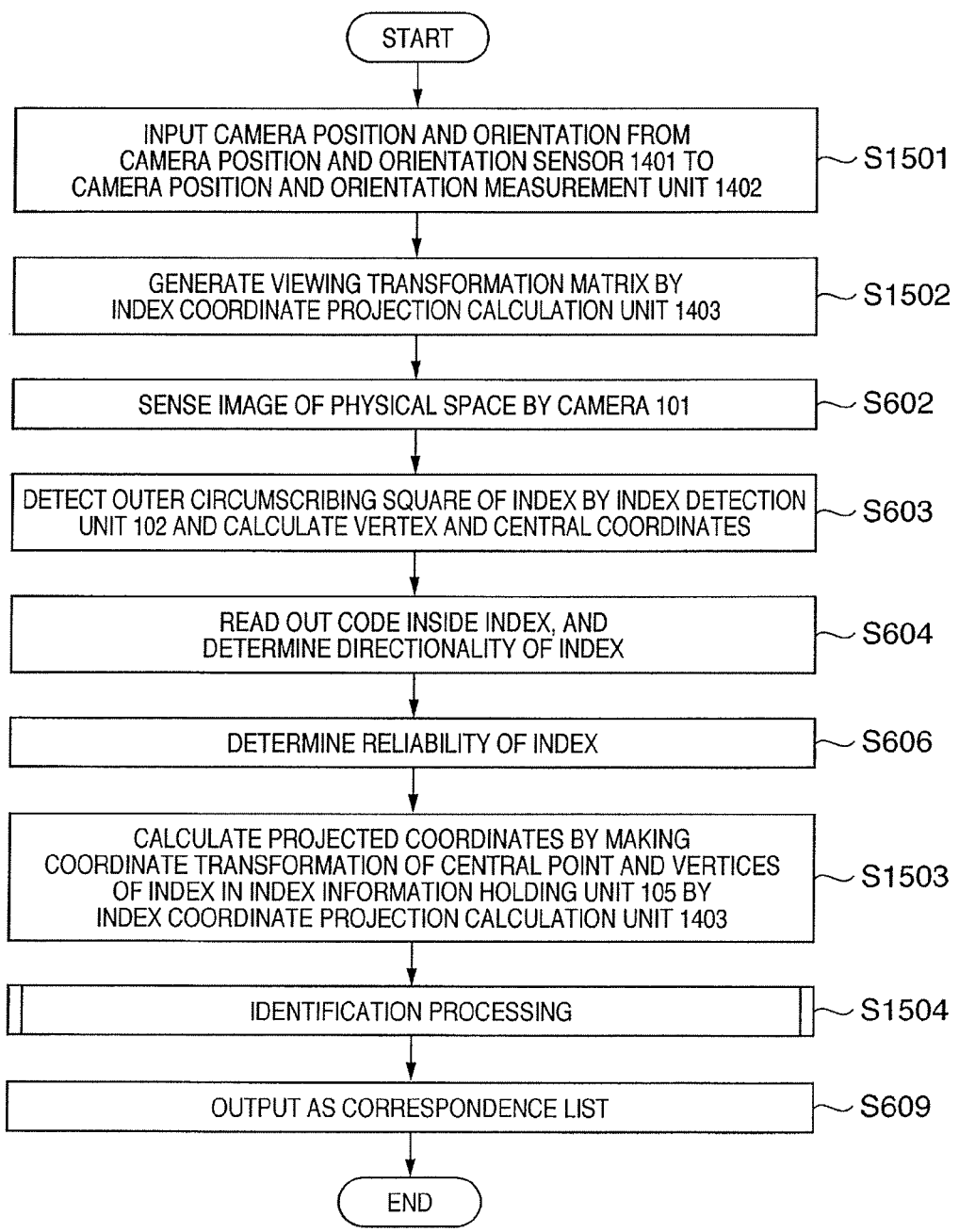
FIG. 15A is a flowchart explaining the processing of the index identification apparatus according to the first modification.

FIG. 15A is a flowchart showing details of the processing of this modification. The same step numbers in FIG. 15A denote the same processing steps as those in the first embodiment shown in FIG. 6A.

In step S1501, the camera position and orientation sensor 1401 inputs the camera position and orientation to the camera position and orientation measurement unit 1402.

In step S1502, the camera position and orientation measurement unit 1402 calculates the viewing transform, also called the viewing transformation, from the position and orientation results of the camera in the form of a 4×4 transformation matrix. Note that the viewing transformation is a coordinate transformation between the camera coordinate system and a reference coordinate system when a coordinate system which is set by being fixed to the real world is used as the reference coordinate system. More specifically, the viewing transformation is a transformation from the coordinate value on a world coordinate system to that on the camera coordinate system. That is, by calculating the viewing transform, the transformation from the coordinate value on the reference coordinate system to that on the camera coordinate system can be easily calculated.

In step S602, the camera 101 senses an image of the physical space as in the first embodiment.

In step S603, the index detection unit 102 detects an outer circumscribing square and calculates the coordinates of the vertices and central point of the square as one process for detecting indices from the obtained sensed image as in the first embodiment.

In step S604, the identification code recognition unit 103 recognizes the identification code inside each index, further determines the directionality of the index, and generates and outputs an index candidate list, as in the first embodiment.

In step S606, the reliability calculation unit 104 calculates the reliability of the detected index of interest for each detected index in the index candidate list as in the first embodiment.

In step S1503, the index coordinate projection calculation unit 1403 applies the following processing to each detected index in the index candidate list. The index coordinate projection calculation unit 1403 transforms the positions (coordinates) of the central point and vertices of the detected index of interest on the reference coordinate system recorded in the index information storage unit 105 into those on the camera coordinate system based on the identification code obtained in step S604 using the viewing transformation calculated in step S1502. Furthermore, the unit 1403 calculates the estimated positions (projected coordinates) of the central point and vertices of the detected index of interest on the image sensing plane by making a perspective projection calculation of the camera 101. Since the individual vertices are respectively recorded in distinction from each other, which of the vertices is projected can be specified even on a projection coordinate system obtained by projecting the individual vertices onto the image sensing plane. Note that the perspective projection transformation of the camera 101 is uniquely determined by the lens focal length and principal point (projection center) position of the camera 101, and is calculated in advance prior to execution of this modification.

In step S1504, the index identification unit 106 verifies an identification code for each detected index in the index candidate list using the reliability of the detected index of interest calculated in step S606, and the projected coordinates of the central point and vertices of the index calculated in step S1503. Then, the unit 106 deletes the detected index which is determined as a mismatch from the index candidate list.

In step S609, the information of each detected index in the index candidate list obtained as a result of the above processing is recorded in the correspondence list in the index information storage unit 105. Also, that information is externally output via an I/F (not shown). Note that the information of the detected index includes the identification code, the 2D image coordinate values of the respective vertices of the index obtained in step S604, and the 3D coordinate values of the vertices in the index information storage unit 105.

Figure 15B:
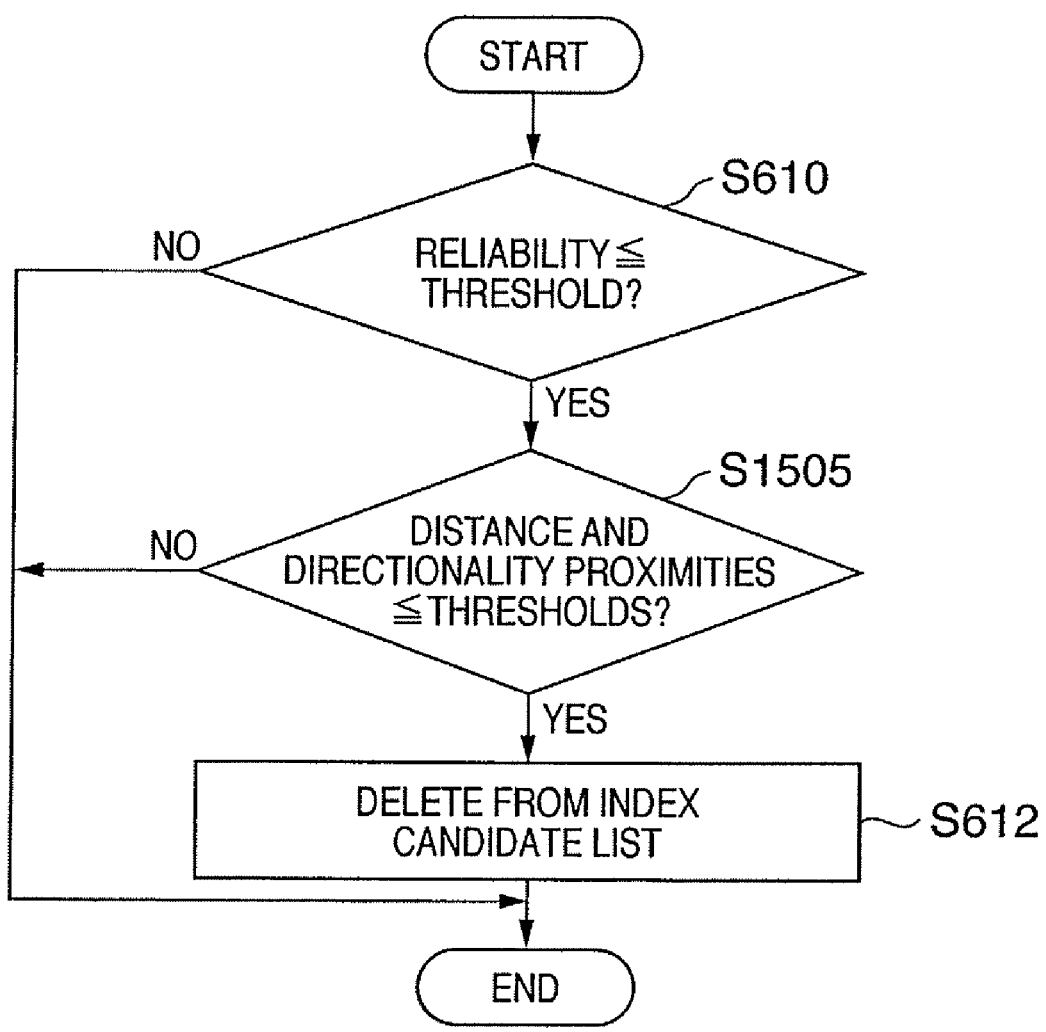
FIG. 15B is a flowchart for explaining the processing in step S1504 in FIG. 15A.

Details of the identification processing executed by the index identification unit 106 in step S1504 will be described below using FIG. 15B. The same step numbers in FIG. 15B also denote the same processing steps in the first embodiment described using FIG. 6B.

In step S610, the index identification unit 106 determines processing of the detected index of interest according to its reliability as in the first embodiment. If the reliability of the index is equal to or lower than a threshold, the index identification unit 106 determines that the identification code is likely to be misrecognized, and the process advances to step S1505. If the reliability of the index is higher than the threshold, the index identification unit 106 determines that the recognized identification code is sufficiently reliable, and the processing ends.

In step S1505, the index identification unit 106 checks a proximity. The index identification unit 106 compares the coordinates of the central point of the detected index obtained in step S603 with the position of the central point of the projected index obtained in step S1503. Upon comparing the index positions on an image, the unit 106 may calculate the distance between two points on the image as a position proximity at the image coordinates. Furthermore, the unit 106 compares the directionality of the detected index of interest on the image and that of the projected index on the image. As the method of comparing the directionalities of the indices on the image, for example, the following method is used.

That is, the unit 106 calculates, as a directionality proximity, the inner product of:

(1) a vector from the projected coordinates of the central point of the index obtained in step S1503 to the projected coordinates upon projecting the coordinates of the vertex close to bit assignment area No. 12 of the code part 201b in the index 301 shown in FIG. 2; and (2) a vector from the central point of the index detected in step S604 to the vertex close to bit assignment area No. 12 (a bit whose color is a distinctive color from the background of the 4-bit areas of the directionality specifying shape) of the code part 201b.

If the position and directionality proximities calculated in this way are equal to or lower than predetermined thresholds, the process advances to step S612. If the proximities are high, the processing ends.

In step S612, the index identification unit 106 determines that the identification code of the index recognized in step S604 is wrong, and deletes the detected index of interest from the index candidate list.

Note that the same processing as in step S1505 is executed for the detected index with a high reliability, and if the position and directionality proximities of the index are low, it may be determined that the position and orientation sensor has suffered errors, and a warning may be generated to the user.

This modification is not limited to verification of the identification information of the index using the position and directionality proximities of the index on the image, and any other methods of verifying the identification information using the ways of appearance of indices on the image as a feature may be applied. For example, verification may be made based on the proximity between the estimated value (calculated from the projected coordinates of the vertices) of the size (an area of a rectangle or the like) on the image coordinate system of the index, and the detected value or the like. The position and directionality of the index need not be used at the same time, and a verification method based on at least one of the ways of appearance such as the position, directionality, size on the image coordinate system, or the like of the index may be used.

<Second Modification>

In the first modification, the position and orientation of the camera are measured using the 6-degrees-of-freedom sensor, indices are projected onto the sensed image using the location information in the index information storage unit 105, and the identification information of each index is verified using the way the index appears on the sensed image. However, an arrangement that makes verification using information indicating how to locate indices with respect to the camera position and orientation may be adopted.

This modification verifies index information using two pieces of information indicating whether or not the visual field of the camera includes each index, and whether or not an angle the normal direction of the index makes with the visual axis direction falls within a predetermined value range, as an example using the relative layout information of the index with respect to the current camera position and orientation.

This modification need only make a change based on the first modification. That is, the perspective projection transformation of the index is omitted in processing step S1503 executed by the index coordinate projection calculation unit 1403. In step S1505 as a part of the processing of the index identification unit 106, processing for verifying the identification code based on the position and orientation of the index on the camera coordinate system, e.g., the following processing is executed.

The index identification unit 106 checks if the assumed visual field of the camera includes the 3D position of the index obtained by the index coordinate projection calculation unit 1403. This checking processing can be attained by seeing whether or not a view volume determined by the information (the lens focal length and principal point position of the camera 101) of the perspective projection transformation of all the 3D coordinate values of the central point and vertices of the index.

The index identification unit 106 checks if the index is directed to a direction seen from the camera. This checking processing can be attained by seeing if whether or not the angle the normal direction of the index makes with the visual axis direction of the camera falls within a predetermined value range. The angle the normal direction of the index makes with the visual axis direction of the camera can be calculated by, e.g., the inner product of respective direction vectors.

The normal direction of the index may be held in the index information storage unit 105 in advance, or may use the outer product value of vectors JK and KL calculated from the 3D coordinate values of the vertices corresponding to vertices J, K, M, and L shown in FIG. 3.

Note that it is not indispensable to execute both verification as to whether or not the visual field of the camera includes the index position and a determination as to whether or not the angle the normal direction of the index makes with the visual axis direction falls within a predetermined value range, and an arrangement that executes one of these processes may be adopted. Also, a determination may be made using another criterion (e.g., a criterion as to whether or not the distance from the camera to the index falls within a threshold range) based on the location relationship between the camera and index. Furthermore, verification based on the information associated with the way the index appears on the image in the first modification may be used together.

<Third Modification>

The first modification verifies whether or not an identification code obtained by the identification code recognition unit 103 is correct by comparing the way the index projected at the position on the image estimated using the location information of the index corresponding to that identification code appears, and the way the index actually detected from the sensed image appears. As another arrangement for implementing a similar verification method, the following method may be used. Using the location information of all indices registered in the index information storage unit 105, the ways respective projected indices appear are estimated. Then, an identification code (second identification code) of each projected index which appears on the image in a similar way to the index detected from the sensed image is obtained, and is integrated with an identification code (first identification code) recognized from the image, thus determining an identification code to be finally adopted.

This modification can be realized by making the following change based on the first modification. In step S1503, the index coordinate projection calculation unit 1403 estimates the ways respective indices appear (projected indices) on the image using the location information of all the indices registered in the index information storage unit 105. Furthermore, in the processing of step S1505, the index identification unit 106 checks the proximity of the detected index to all the projected indices, and determines that an identification code of an index with a highest proximity is that (second identification code) corresponding to the detected index. Furthermore, the index identification unit 106 compares the second identification code obtained as a result of the former processing with an identification code (first identification code) recognized from the sensed image, and determines the subsequent processing depending on whether or not the two identification codes match. That is, if the two identification codes match, the unit 106 determines that the identification code is correct, thus ending the processing. On the other hand, if the two identification codes do not match, the unit 106 determines that the identification code is wrong, and the process advances to step S612. If the proximities of all the projected indices do not exceed the threshold in step S1505, the index identification unit 106 deletes the detected index of interest from the index candidate list in step S612.

Note that the reliability of measurement of the 6-degrees-of-freedom position and orientation sensor or the like may be obtained by another means. In this case, the reliability of the second identification code is calculated based on the reliability obtained by the other means, and if the reliability of the second identification code is high in step S1505, the second identification may be adopted without being compared with the first identification code.

<Fourth Modification>

The second modification verifies based on the relative position and orientation relationship between the camera and index estimated using the location information of the index corresponding to the identification code of interest whether or not the identification code obtained by the identification code recognition unit 103 is correct. As another arrangement that implements a similar verification method, the following method is available. The relative positions and orientations of respective indices with respect to the camera are estimated using the location information of all the indices registered in the index information storage unit 105. Then, an identification code (second identification code) which meets a given condition is obtained, and is integrated with an identification code (first identification code) recognized from the sensed image, thus determining the identification code to finally adopt.

This modification can be realized by making the following change based on the second modification. In step S1503, the index coordinate projection calculation unit 1403 estimates the relative positions and orientations between the respective indices and camera using the location information of all the indices registered in the index information storage unit 105. In the processing of step S1505, the index identification unit 106 verifies for all the indices if the current visual field assumed by the camera includes the 3D coordinate values of the central point and vertices of each index. Furthermore, the unit 106 verifies whether or not the angle the normal direction of the index of interest makes with the visual axis direction of the camera falls within a threshold range. If only one index meets these verification conditions, the unit 106 determines that an identification code of that index is a corresponding identification code (second identification code), and executes the same processing as in the third modification. If none of indices meet the two verification conditions in step S1505, the unit 106 deletes the detected index of interest from the index candidate list in step S612.

If a plurality of indices meet the two verification conditions, the unit 106 may delete the detected index of interest from the index candidate list without identification, or may make identification using the ways projected indices appear on the image by projecting the indices that meet the two verification conditions onto the image plane as in the third modification.

<Fifth Modification>

The first and second embodiments check according to the reliability if the identification information of an index is verified or corrected by means other than the 2D image processing. Alternatively, an arrangement that always executes verification or correction irrespective of the reliability may be adopted.

For example, if the orientation sensor has high precision, and does not cause any misidentification of indices due to its errors, the index identification processing need not be classified depending on the reliability.

This modification will explain an index identification apparatus which verifies the identification information of an index using means other than the 2D image processing irrespective of the reliability.

This modification can be implemented by making the following change based on the first embodiment. That is, the reliability calculation unit 104 is excluded from the arrangement of the first embodiment, and the index identification unit 106 always verifies the detected index irrespective of the reliability. Furthermore, as the processing steps, steps S606 and S610 of the first embodiment may be excluded, and the processing in steps S611 and S612 may always be executed.

<Sixth Modification>

The first modification verifies the identification information of an index using a 6-degrees-of-freedom sensor. However, in the present invention, the orientation sensor or 6-degrees-of-freedom sensor is not indispensable to verify the identification information, and information other than the position and orientation may be applied as long as it is used to correctly obtain the identification information of the index. For example, the indices which appear in the current sensed image may be identified using the position and orientation of the camera 101, which are calculated using the immediately preceding sensed image (to be referred to as a previous frame image hereinafter).

This modification can be implemented by making the following change based on the first modification. That is, the camera position and orientation sensor 1401 is excluded from the arrangement of the index identification apparatus of the first modification, the camera position and orientation measurement unit 1402 acquires index data (correspondence list) after identification obtained from the sensed image of the previous frame, and the position and orientation of the camera 101 can be input based on that list.

As a method of calculating the camera position and orientation based on the correspondence list of indices, for example, a camera position and orientation identification method described in reference D3 can be used. The camera position and orientation identification method described in reference D3 estimates the camera position and orientation components that minimize errors upon projecting the respective vertices onto the image coordinate system of the camera under a limiting condition that the outer shape is square. Based on the camera position and orientation obtained in this way, the location information of each index is projected onto the sensed image, and a comparison can be made with the information of the detected index, as in the first modification.

<Seventh Modification>

In the sixth modification, the identification information of each index is verified using the camera position and orientation obtained based on the previous frame. However, for example, the position and orientation of the camera 101 may be estimated based on some indices which have already been identified from the sensed image of a plurality of indices, and each index may be identified using the estimated camera position and orientation. For example, after the camera position and orientation measurement unit 1402 receives information of an index candidate with a high reliability to obtain the camera position and orientation, an index with a low reliability may be identified.

<Eighth Modification>

The first and second embodiments use an index which has a square outer shape and has an internal code area. However, an index having a specific outer shape need not be used, and an index (marker) having no outer shape may be used, as described in reference D4.

A marker 120 of this modification uses a marker described in reference D4. That is, the marker 120 is configured by a rectangular bar, four corner squares, and a 2D barcode part inside the four corner squares.

In this case, the detection processing of 2D code data described in reference D2 may be used in place of the index detection unit 102 and identification code recognition unit 103. That is, the sensed image is binarized, and a black pixel coupled region is determined. Furthermore, a rectangular logo mark cell part as a reference for recognition processing is detected, corner cells within a predetermined search range are detected, and the four detected points are registered as the vertices of the index outer shape of the first embodiment. Since other processes are the same as those in the first embodiment, a description thereof will be omitted.

<Ninth Modification>

The first and second embodiments use an index which has a square outer shape and has an internal code area. Alternatively, an index which has a specific internal pattern for identification, as described in reference D1 may be used.

Upon using such index, template matching detection processing described in reference D1 may be used in place of the identification code recognition unit 103 in the first embodiment. That is, a pattern formed within the four vertices of the index outer shape that appears in the sensed image is acquired as an image. The pattern is then normalized to a square shape by homography transformation for searching a corresponding pattern from template images of the patterns, which is registered in advance in the index information storage unit 105. Accordingly, the identification information is recognized.

That is, the index information storage unit 105 registers template images of patterns printed inside respective indices located on the space in addition to the index information in the first embodiment. Since other processes are the same as those in the first embodiment, a description thereof will be omitted.

<Tenth Modification>

The first and second embodiments use artificially generated indices. However, natural features may be used as indices. For example, like an SIFT (Scale Invariant Feature Transformation) feature amount disclosed in I. Skrypnyk, D. G. Lowe: Scene Modeling, Recognition and Tracking with Invariant Image Features, Proc. International Symposium on Mixed and Augmented Reality (ISMAR '04), pp. 110-119, 2004, a feature amount with which an identifier unique to a natural feature can be exclusively acquired from a sensed image of that natural feature in a scene can be used as an index. Upon identifying such feature amount, the verification method described in the second and fourth modifications can be used. For example, an identifier obtained from only image information can be verified using the 3D position of the natural feature and the approximate position and orientation of the camera based on whether or not the visual field includes the natural feature.

Other Embodiments

The aforementioned embodiments and modifications have explained the index identification apparatus including the camera and the 3D orientation sensor or 3D position and orientation sensor for the sake of easy understanding. However, these components are not indispensable to the index identification apparatus. That is, an arrangement which performs position and orientation measurement or 3D orientation measurement of the camera, and image sensing using another apparatus, and receives the measurement result and sensed image from the other apparatus may be adopted. In place of real-time processing, identification processing can be made using the recorded 3D position measurement result and sensed image.

The aforementioned embodiments and modifications have explained a case wherein the 6-degrees-of-freedom position and orientation sensor is attached to the camera, and indices are fixed at known positions in an environment. However, the indices need not always be fixed in the environment, and may be attached to a movable object. In this case, a 6-degrees-of-freedom position and orientation sensor is also mounted on the object on which the indices are attached to measure the relative position and orientation of the camera with respect to that object. In this way, these indices can be handled in the same manner as fixed indices. The same applies to a situation in which the camera is fixed at a known position in an environment, and only an object having indices moves. Therefore, verification having the same effects can be made as long as the approximate relative position and orientation between the camera and object can be measured.

Note that the present invention includes a case wherein the equivalent functions are achieved by executing a software program that implements the functions of the aforementioned embodiments by a system including a computer or a computer of an apparatus. The program is supplied, to the system including the computer or the computer, directly from a recording medium or using wired/wireless communications.

Therefore, the program code itself supplied to and installed in the computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, a hard disk, magnetic tape, and the like may be used. Also, optical/magneto-optical storage media such as an MO, a CD-ROM, a CD-R, a CD-RW, a DVD-ROM, a DVD-R, a DVD-RW, and the like, a nonvolatile semiconductor memory, and so forth may be used.

As a program supply method using the wired/wireless communications, the following method may be used. That is, a server on a computer network may store a data file (program data file) that can be a computer program which forms the present invention on a client computer. Then, the program data file is downloaded to a client computer that establishes connection to the server. In this case, the program data file may be segmented into a plurality of segment files, which may be allocated on different servers. As the program data file, the computer program itself that forms the present invention, a compressed file including an automatic installation function, or the like may be used.

That is, the present invention includes a server apparatus which makes a plurality of users download the program data file for implementing the functional processing of the present invention on a computer.

Also, the program may be supplied as follows. That is, a storage medium such as a CD-ROM or the like, which stores the encrypted program of the present invention, may be delivered to the user, and the user who has met a predetermined condition may be allowed to download key information that is used to decrypt the encrypted program via the Internet. In this case, the encrypted program may be executed using that key information to be installed on a computer, thus implementing the present invention.

The functions of the aforementioned embodiments may be implemented not only by executing the readout program code by the computer but also using other programs. For example, the functions of the aforementioned embodiments can be implemented when an OS or the like running on the computer executes some or all of actual processing operations on the basis of an instruction of that program.

Furthermore, the functions of the aforementioned embodiments may be implemented by executing the program read out from the recording medium by a function extension board or a function extension unit, which is inserted in or connected to the computer. More specifically, a memory and a CPU of the function extension board or function extension unit may execute the program to assume some or all of actual processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-362371, filed on Dec. 15, 2005, which is hereby incorporated by reference herein in its entirety.

What is claimed is:

1. An information processing method comprising:
   an image sensing step of acquiring sensed image data by sensing physical space by an image sensing unit;
   an orientation acquiring step of acquiring orientation information of the image sensing unit with an orientation acquiring unit;
   an index detecting step of detecting an index from the sensed image data with an index detection unit;
   a first calculation step of calculating a first reliability of the detection result based on the image data of the detected index in the sensed image data, without using the orientation information, with a first reliability calculation unit;
   a second calculation step of calculating a second reliability of the detection result based on predetermined index information, the orientation information, and the image data of the detected index in the sensed image data, with a second reliability calculation unit; and
   a determination step of determining, if the first reliability is high, that the detected index is an index included in the sensed image data, and if the first reliability is not high and the second reliability is low, that the detected index is not an index included in the sensed image data.

2. The information processing method according to claim 1, wherein said orientation information is a measured value of a sensor detecting an orientation of the image sensing unit.

3. The information processing method according to claim 1, wherein said orientation information is the orientation information of the image sensing unit acquired at a previous frame.

4. The information processing method according to claim 1, wherein said orientation information is calculated by the orientation acquiring unit based on indices detected from the sensed image data whose first reliability are high.

5. The information processing method according to claim 1, wherein said second calculation step also detects and corrects an identification error of the detected index, and reflects whether or not the correction has been carried out in said second reliability of the detected index.

6. The information processing method according to claim 1, wherein said first calculation step calculates said first reliability of the detected index by using the number of pixels of the image of the detected index in the sensed image data.

7. A computer readable recording medium storing a computer program for making a computer execute an index identification method according to claim 1.

8. The information processing method according to claim 1, wherein the determination step determines that the first reliability is high when the first reliability is above a first predetermined threshold, wherein the determination step determines that the first reliability is not high when the first reliability is below the first predetermined threshold, wherein the determination step determines that the second reliability is low when the difference between the orientation of the index based on index information stored in a storage unit that stores orientation of indices, and the orientation of the index based on the image data of the index detected by the index detecting step is below a second predetermined threshold.

9. An information processing apparatus comprising:
   an image acquiring unit which acquires sensed image data obtained by sensing physical space by an image sensing unit;
   an orientation acquiring unit which acquires orientation information of the image sensing unit;
   an index detecting unit which detects an index from the sensed image data;
   a first computation unit which calculates a first reliability of the detection result based on the image data of the detected index in the sensed image data, without using the orientation information;
   a second computation unit which calculates a second reliability of the detection result based on predetermined index information, the orientation information, and the image data of the detected index in the sensed image data; and
   a determination unit which determines, if the first reliability is high, that the detected index is an index included in the sensed image data, and if the first reliability is not high and the second reliability is low, that the detected index is not an index included in the sensed image data.

10. The information processing apparatus according to claim 9, wherein said orientation information is a measured value of a sensor detecting an orientation of the image sensing unit.

11. The information processing apparatus according to claim 9, wherein said orientation information is the orientation information of the image sensing unit acquired at a previous frame.

12. The information processing apparatus according to claim 9, wherein said orientation information is calculated by said orientation acquiring unit based on indices detected from the sensed image data whose first reliability are high.

13. The information processing apparatus according to claim 9, wherein said second computation unit also detects and corrects an identification error of the detected index, and reflects whether or not the correction has been carried out in the second reliability of the detected index.

14. The information processing apparatus according to claim 9, wherein said first computation unit calculates the first reliability of the detected index by using the number of pixels of the image of the detected index in the sensed image data.

15. The information processing apparatus according to claim 9, wherein the determination unit determines that the first reliability is high when the first reliability is above a first predetermined threshold, wherein the determination unit determines that the first reliability is not high when the first reliability is below the predetermined threshold, wherein the determination unit determines that the second reliability is low when the difference between the orientation of the index based on index information stored in a storage unit that stores orientation of indices, and the orientation of the index based on the image data of the index detected by the index detecting unit is below a second predetermined threshold.

* * * * *